Nov. 9, 1965    W. F. PLUME    3,216,278
VALVE CONTROL
Filed Oct. 20, 1961    8 Sheets-Sheet 7
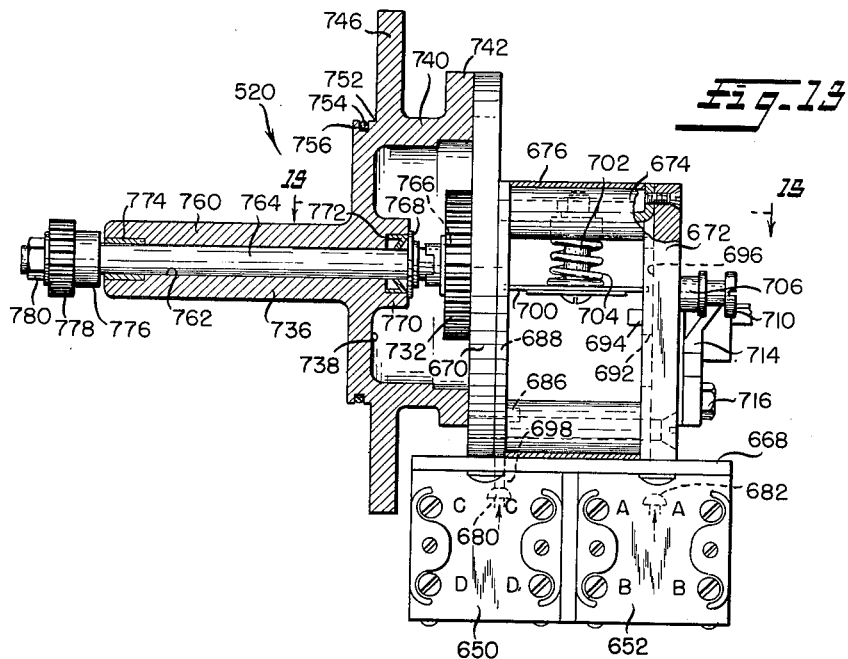
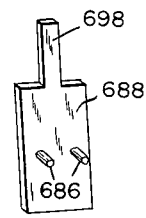
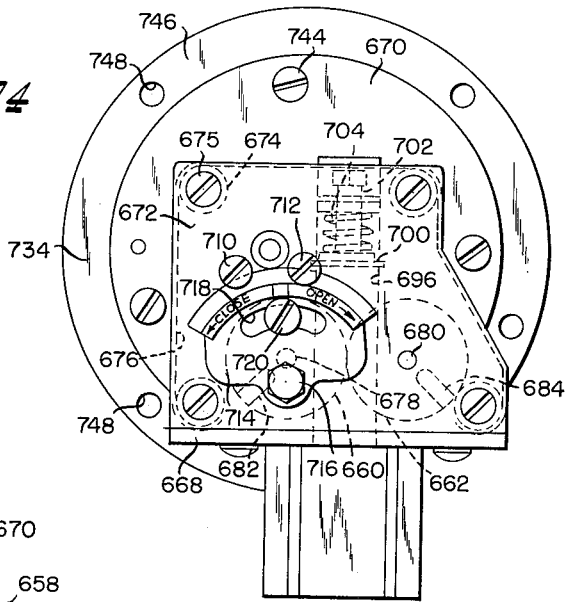
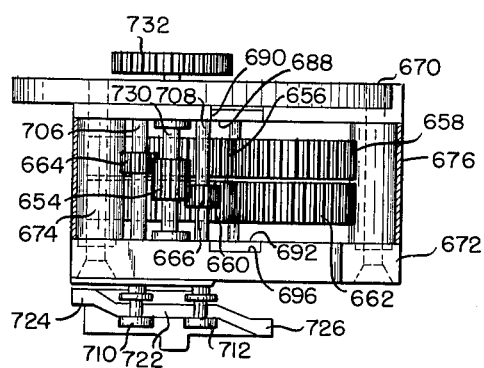
INVENTOR
William F Plume
BY
ATTORNEYS

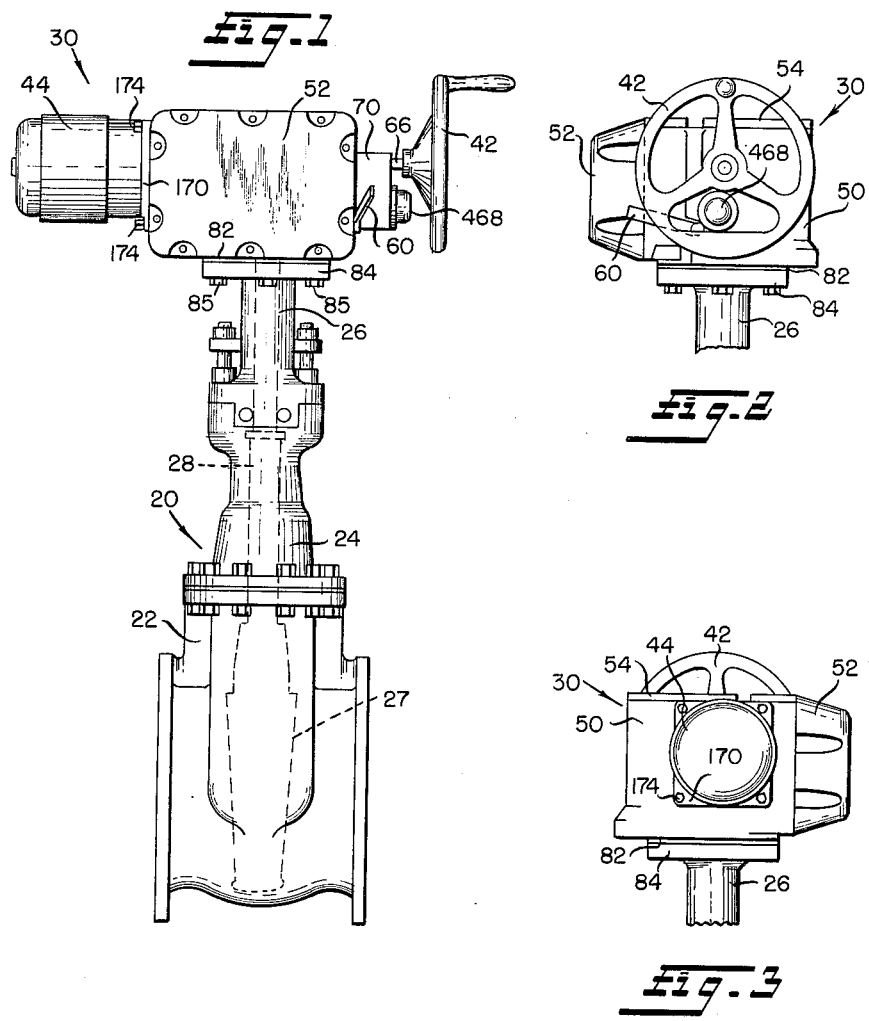

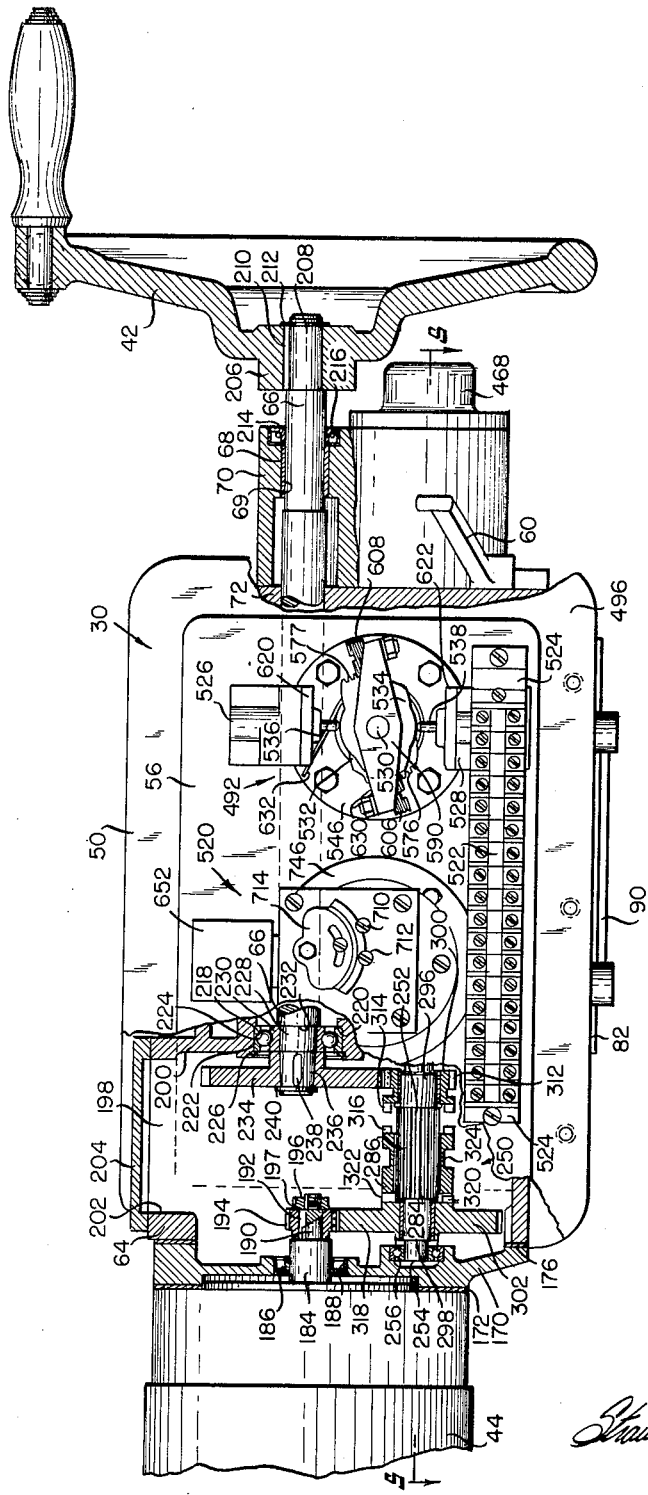

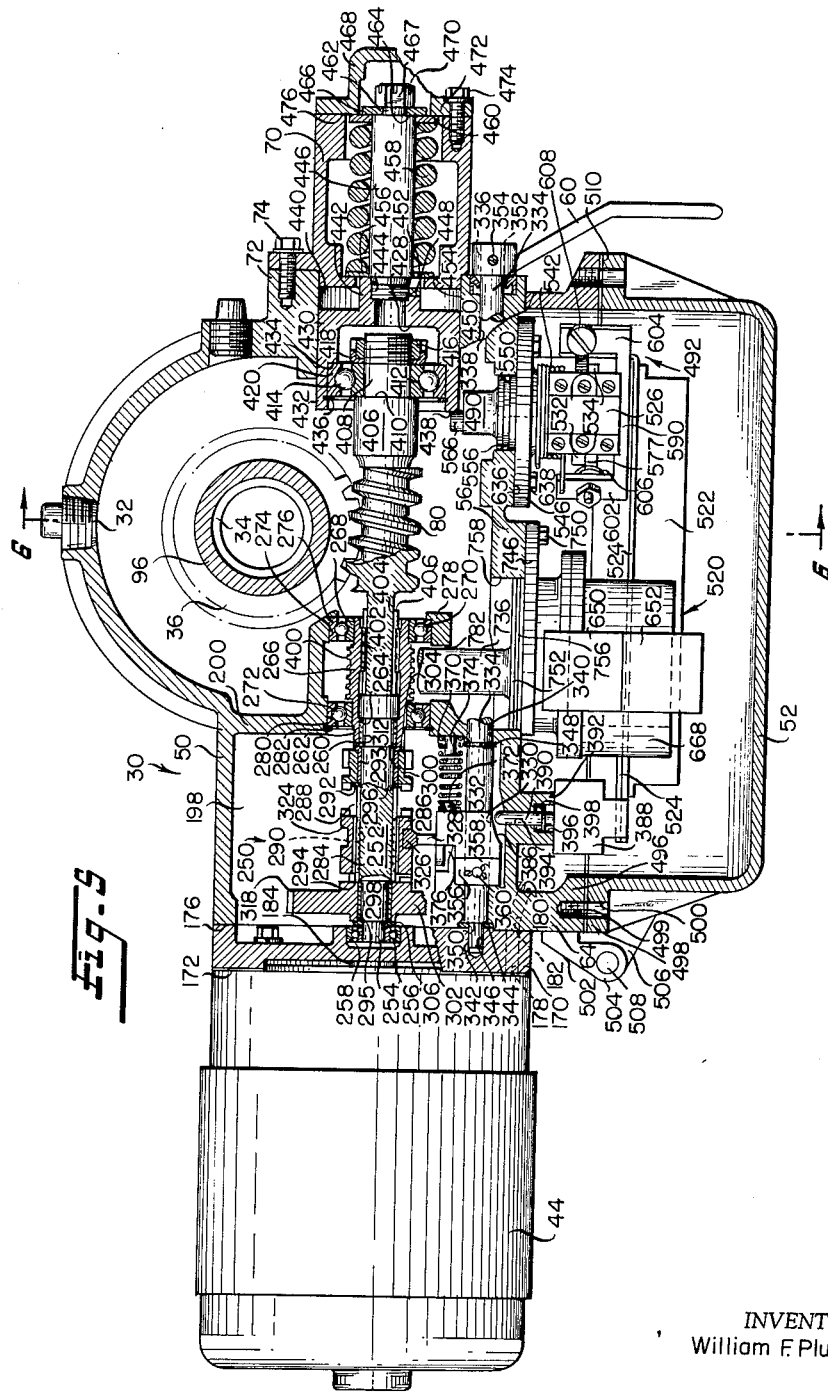

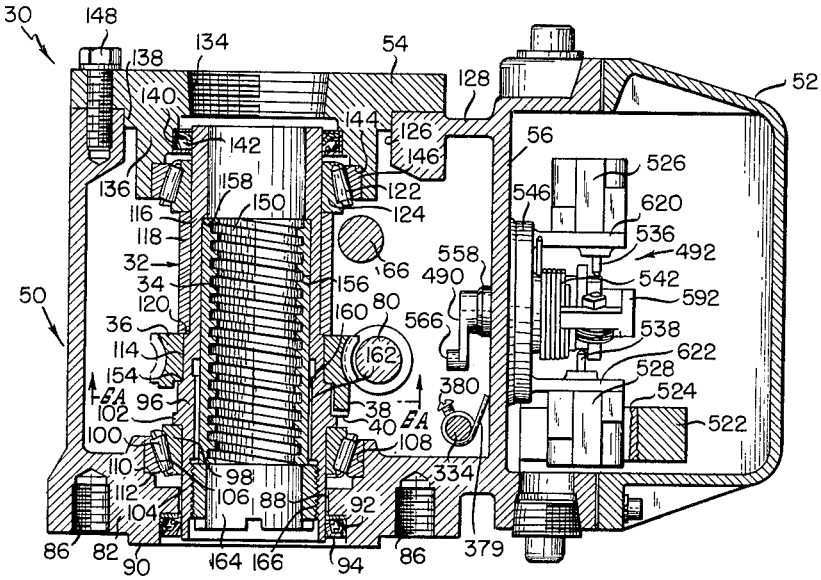
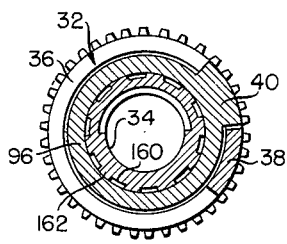
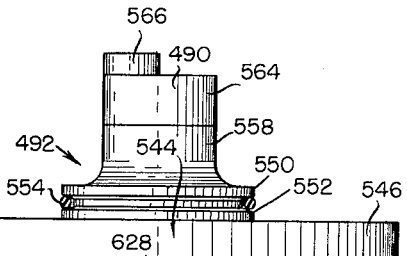
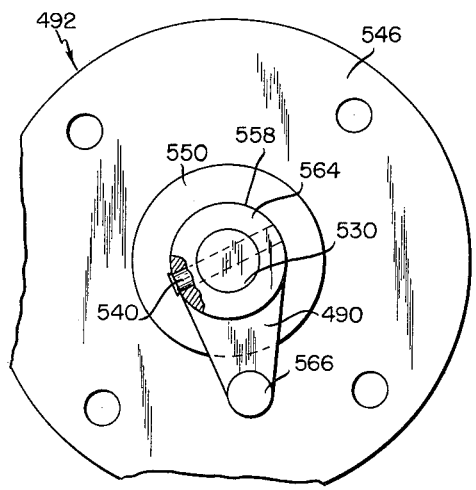
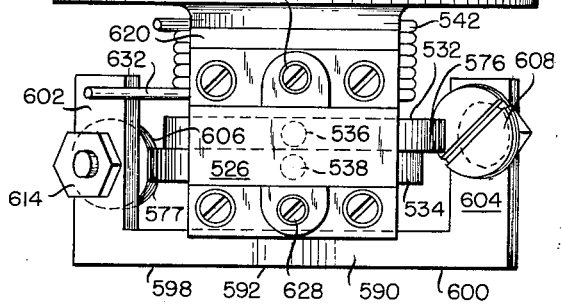
INVENTOR
William F. Plume

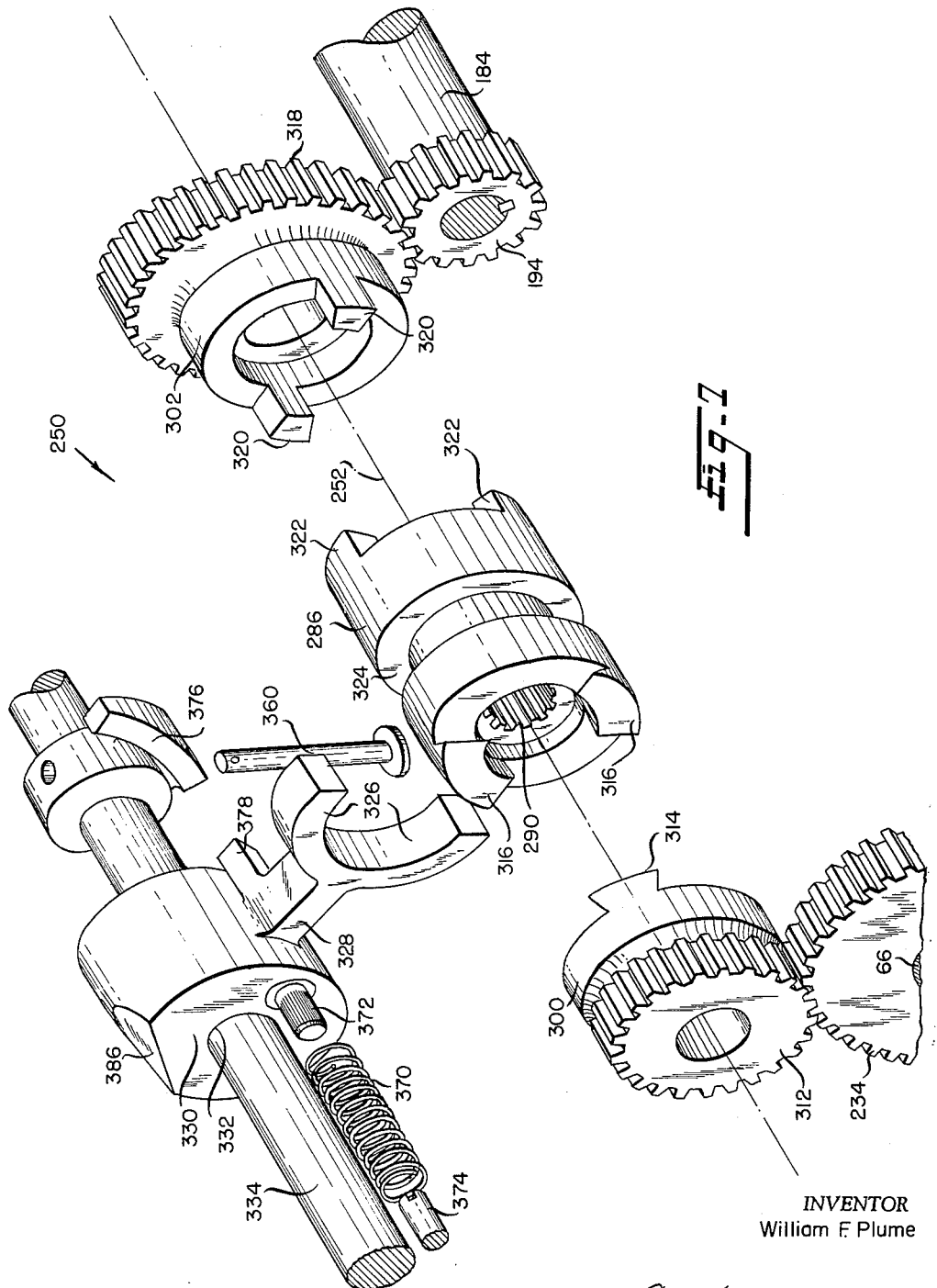

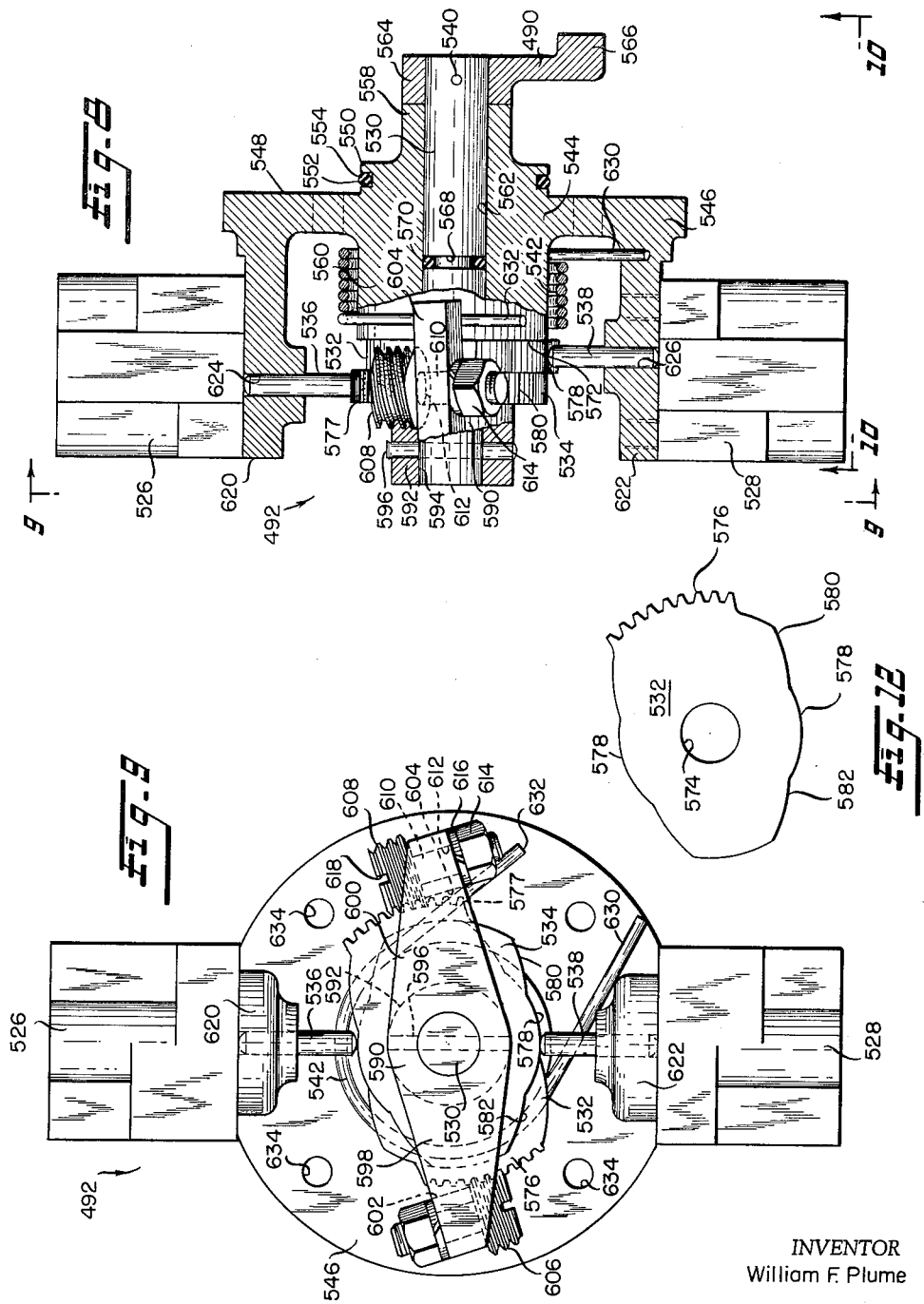

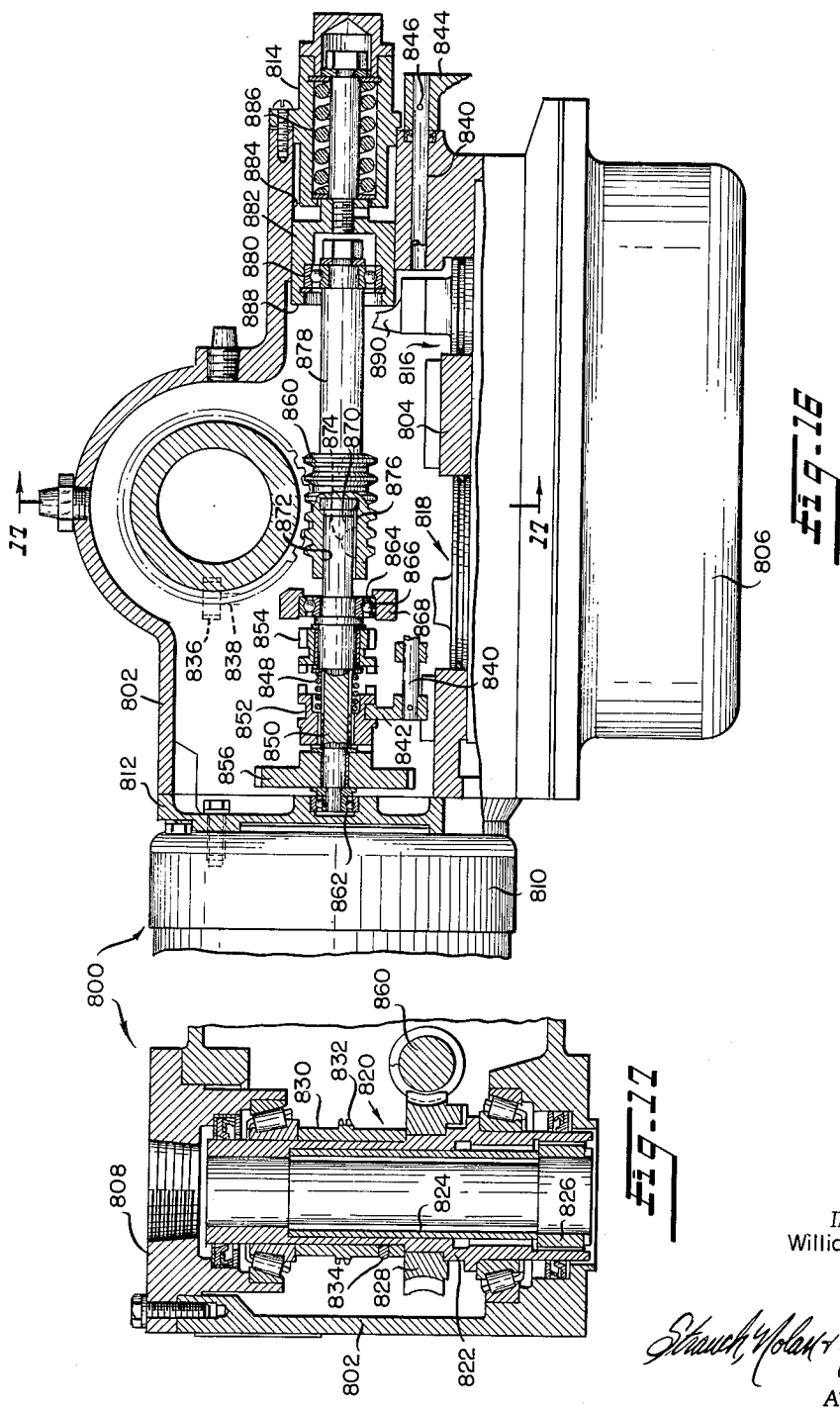

United States Patent Office 3,216,278
Patented Nov. 9, 1965

3,216,278
VALVE CONTROL
William F. Plume, Wheaton, Ill., assignor, by mesne assignments, to Link-Belt Company, a corporation of Illinois
Filed Oct. 20, 1961, Ser. No. 146,648
17 Claims. (Cl. 74—625)

This invention relates to improvements in valve control mechanisms and more particularly relates to that type of valve operator which includes a motor drive together with provision for selective auxiliary handwheel operation.

The valve control is incorporated in a unitary assembly specifically adapted for use with the reciprocable gate type of valves in which either the valve stem is non-rotatable, axially shiftable and includes screw threads and there is a cooperating rotary nut in the control assembly which raises or lowers the valve stem, or the valve stem is rotatable and by means of screw threads causes reciprocation of the disc to open and closed position. In both types, valve control operation is derived through rotation of a rotary member which encircles and drives the valve stem.

These dual power source (motor and hand-operated) valve controls have been developed quite extensively and most controls which today appear on the market include some form of selective clutching arrangement with various safety aspects between the motor drive mechanism and the handwheel drive mechanism, both of which can be coupled to a power shaft which conventionally drives through a worm thread cooperating with a worm wheel secured in some manner to the rotatable elements surrounding the valve stem, and the rotatable element is connected through splines or screw threads to the valve stem.

Many of the operators on the market include a safety cut-out in the motor control system whenever upper torque limits are exceeded. These operators also include take-offs operating some form of position limit control which, in the case of electric motors, constitute electric switches in the motor control circuit. The transmission enabling drive connection from the manual handwheel drive or from the motor to the worm shaft includes a clutching mechanism and the clutch shifting mechanism sometimes includes safety devices to prevent concurrent handwheel and motor operation.

The valve control of the present invention incorporates improvements in the dual power source clutching and clutch shift mechanisms, the worm shaft mounting, the torque limit assembly and the rotatable valve stem drive member. All of these improvements are interrelated into an acceptable and dependable valve operator which is superior to previously known operators in trouble-free operation and simplicity and which can be manufactured for a reduced cost over the complex mechanisms of prior art devices.

Generally, the disclosed valve operator invention includes, among other things, a new concept of lightweight clutching mechanism having special arrangement of clutch teeth by which the transmission is maintained in handwheel drive position so long as handwheel torque is applied, after which the clutch automatically shifts back to its normal condition of motor drive. The worm shaft preferably has a solid worm and is supported by means of a special telescoped mounting structure with a reduced number of properly disposed bearing mounts and provides torque limit shifting movements in both of the valve open and closed positions. A highly reliable, simple torque limit switch is actuated by the torque limit shift movements of the worm shaft in both directions, utilizing a dependable, unique and accurate torque switch position adjustment mechanism for both directions of movement. This control utilizes a removable rotatable member wear sleeve insert which is assembled from the bottom of the control assembly enabling versatility and flexibility in matching standardized valve control assemblies with various sizes and styles of valves, the two components being normally manufactured by different manufacturers. The wear sleeve inserts can thus be furnished to the valve manufacturers by the valve control manufacturers enabling the valve manufacturer to machine the nut sleeves to fit his specific valves whereupon it would remain only for the nut sleeve to be inserted into the standardized valve control assembly for a customized operational cooperation between the valve control and the valve at the customer's location.

Accordingly, the primary object of this invention resides in the provision of an improved dual drive, motor and manual, valve control with novel simplified, compact and reliable condition responsive control components.

Another object resides in the provision, for use with reciprocable gate type valves, of an improved valve control having motor and manual drive mechanisms, a transmission which can selectively drive couple either drive mechanism with a rotatable valve stem drive sleeve, the selective drive coupling including a clutch assembly with novel retention means operable upon positive actuation to manual drive to maintain the transmission in manual drive so long as manual drive torque is applied, the drive path between the transmission and the valve stem being simplified for minimum bearing support locations, utilizing a solid integral worm and worm shaft, an axially fixed spline sleeve coupling between transmission and worm shaft, a bi-directional worm shaft torque responsive spring cage supporting one end of the worm shaft, a novel drive sleeve wear insert structurally associated with the drive sleeve for bottom removal without dismantling or disturbing any journalled components of the valve control assembly, and position limit and torque limit assemblies disposed in a compartment sealed from the valve drive mechanism proper and readily accessible for assembly, adjustment and removal of components mounted therein, the position limit assembly cooperating with the spline sleeve for condition responsive take-off and the torque limit assembly cooperating with the torque spring retainer for bi-directional condition responsive take-off.

In conjunction with the foregoing object, it is a further object to provide an improved double gear set, dual position limit switch actuator with a high value of input reduction, including an adaptor plate with a spigotted sealed projection enabling fluid tight motion transfer to the control component compartment from the interior of the valve control unit. Similarly, the novel torque limit assembly includes a spigotted sealed projection enabling fluid tight motion transfer to the control component compartment from the interior of the valve control unit.

In further conjunction with the complete valve control assembly noted in the previous objects, a further object resides in providing an internal passage for electrical line connections between the motor and the readily accessible control component compartment with additional structure enabling hinged opening of a sealed cover over the compartment, whereby the complete valve control can be made explosive proof by adding an external electric line conduit from the motor to the compartment, plugging the electric line passage and omitting the cover seal.

A further object resides in the provision of an improved dual drive, motor and manual, valve control with novel clutching and clutch shift mechanism between the dual drive sources and the control output drive component.

Still another object resides in providing, in an operator, a novel transmission with mechanism for shifting a reciprocable clutch member easily and readily in whichever direction is involved to a position for making a drive connection from the particular driving means which is being actuated, one drive being a normal disposition under spring bias and the other position being selective under application of external force and subsequently maintained against spring bias only so long as torque is applied through the respective turning means.

Another object resides in the provision, in a clutch mechanism, for an arrangement in which a shiftable clutch member is adapted to turn a shaft on which the clutch member is non-rotatably mounted but axially shiftable through a neutral position between two operative positions respectively for engagement with manual and power driving means, whereby but one of said driving means can engage said clutch member at one time to turn said shaft, the member is spring biased toward engagement with the power driving means and has bi-directional dovetail, locking clutching teeth for engagement during manual driving.

A further object resides in the provision of clutch shifting mechanism for valve operators which is novel, compact and simple to operate with reliable clutching in either of two positions to one of which the clutch is resiliently biased, and in the other of which clutching is maintained after shifting by application of external force, during subsequential continuous application of power.

A still further object resides in the provision of a novel power transmission mechanism including dual input drive mechanisms and a single output with a sliding clutch member biased to normally engage one input mechanism with the output and, when manually shifted to engage the other input mechanism with the output, to be automatically maintained by dove-tailed interlocking clutch teeth in that position so long as input torque is applied to the other input.

Still another object resides in the provision of a transmission clutch and shifter assembly including novel cam type clutch shifter mechanism.

A still further object resides in the provision of a novel worm sleeve and shaft assembly providing the main drive connection to the rotatable valve drive sleeve; the worm being supported at a minimum number of points, the bearing load having an extremely short coupled journalling arrangement and being simple to manufacture.

Another object resides in providing in a valve control assembly, a novel solid worm and shaft of rigid construction provided with closely spaced journal mounting of the shaft.

A further object resides in the provision of a valve operator wherein the drive connection to a valve stem is readily accessible for installation, repair or replacement of a novel nut sleeve insert without necessity of removing the drive sleeve or disturbing its bearing installation.

Still another object of this invention resides in the provision of a novel wear sleeve insertable from the under side of the valve control, eliminating the necessity for previously known one-piece drive nuts and enabling the multiple advantages of permitting the wear sleeve blank to be threaded by the valve manufacturer and installed into the valve control at the customer's plant or enabling an old valve control to be changed at the customer's plant from one valve to another merely by incorporation of a new wear sleeve which can be threaded to fit the second valve.

Another object of the present invention resides in providing means for permitting the valve closure disc to be seated with a predetermined and constant pressure in accord with a novel bi-directional drive torque limit control arrangement of torque limit spring retainer assembly and torque limit switch operator.

A further object resides in providing a torque limit switch operator assembly having mechanism for accurate adjustment of the switch actuation point within a range of actuator movement, the adjusting mechanism inherently inhibiting creeping of the set adjusted position.

A still further object resides in the provision of a novel adjustable switch operator with adjusting mechanism enabling and maintaining accurate adjustments.

Still another object resides in the provision of a switch operator with a rotatable device having a peripheral cam type switch operating member adjustably secured for rotation with the rotatable device by means of a worm and worm sector connection between the rotatable device and the peripheral cam member.

A further object resides in the provision of an improved limit switch assembly of the gear type having compact, enclosed high reduction of geared rotation with a reciprocal switch operating member internally biased in a direction away from one limit position and relying upon the inherent bias of an attached spring loaded switch for biasing force in the opposite direction away from the other limit position of the operator.

Still another object resides in the provision of a novel adaptor for a limit switch assembly enabling spigotted locating cooperation with an accurately located receiving opening in a mounting wall and also carrying an O-ring seal on the spigot portion.

Further novel features and other objects of the invention will become apparent from the following detailed description, discussion and the appended claims taken in conjunction with the accompanying drawings showing a preferred structure and embodiment in which:

FIGURE 1 is a side elevation of a representative reciprocating stem gate valve having a valve control assembly made in accord with the present invention and secured on the upper section of the valve yoke;

FIGURES 2 and 3 are opposite end views of the valve control assembly portion of FIGURE 1, illustrating the handwheel and the clutch lever at one end and the motor at the other end;

FIGURE 4 is an enlarged and partially sectioned side view of the valve control seen in FIGURE 1 with the side compartment cover removed, illustrating shaft journalling and various components of the transmission clutch for selective manual or motor drive;

FIGURE 5 is a section view taken on line 5—5 of FIGURE 4 illustrating further details of the clutching components, the main worm shaft journalling arrangement, the torque limit responsive take-off arrangement and the position limit take-off drive;

FIGURE 6 is a vertical section taken on line 6—6 of FIGURE 5 illustrating the position of the torque limit switch and operator and specifically illustrating the wear sleeve insert within the drive sleeve;

FIGURE 6A is a section taken on line 6A—6A of FIGURE 6, illustrating the hammer lug components of the drive nut unit and the splined cooperation between the wear insert and the drive sleeve;

FIGURE 7 is an exploded perspective view illustrating the handwheel clutch and dual drive components;

FIGURE 8 is an enlarged partially sectioned detail view of the torque limit switch and operator assembly;

FIGURES 9 and 10 are enlarged end and side views, respectively, of the torque limit switch and operator assembly seen in FIGURE 8;

FIGURE 11 is an enlarged end view illustrating the operating crank end of the torque limit switch assembly;

FIGURE 12 is a plan view of one of the cam plates used in the torque limit switch assembly;

FIGURE 13 is an enlarged, partially sectioned side view of the position limit switch assembly in combination with its mounting adaptor;

FIGURE 13A is a perspective view of one of the position limit assembly slides;

FIGURE 14 is an end view of the position limit switch assembly shown in FIGURE 13;

FIGURE 15 is a section view taken on line 15—15 of FIGURE 13 to illustrate the internal gearing and manner of making individual limit adjustments to the position limit switch assembly;

FIGURE 16 is a section view similar to FIGURE 5, showing a valve control assembly for use with smaller valves, illustrating a modified clutch operator and a different position limit take-off drive; and FIGURE 17 is a section view taken on line 17—17 of FIGURE 16 to illustrate the position limit take-off gear on the nut drive sleeve.

With specific reference to the drawings for a detailed description, FIGURE 1 shows a reciprocating gate valve 20, consisting of several castings 22, 24 and 26 secured together in a conventional manner with bolts and nuts and including a gate 27 with stem 28. A valve control assembly 30, in accord with the present invention, is fastened to the top of the yoke casting 26 in such manner that the valve stem 28 could project vertically through the valve control casing as will be required when the valve is the type which has a rising stem.

The part of the valve control assembly, providing passage for the threaded valve stem 28, contains the rotatable stem drive nut assembly 32 which, through the internally threaded wear insert 34 (to be later described in detail), is in threaded engagement with the valve stem. Rotation of drive nut assembly 32 in opposite directions causes the valve stem 28 and disc 27 to be moved up or down to open or close the valve 20. In order to rotate the nut assembly 32, a worm wheel 36 is mounted within the valve control assembly casing concentric around the nut assembly and the valve stem. The worm wheel 36 has a degree of rotatable lost motion relative to the rotatable nut assembly 32 provided by an arcuate lug 38 integral with worm wheel 36, seen in FIGURES 6 and 6A, lying in the path of a companion arcuate lug 40 which is an integral part of the rotatable nut assembly 32. The sum of the arcs of the lugs 38 and 40 is approximately 90° permitting a 270° lost motion of the lug 38 between points where it will strike the opposite ends of the lug 40. This permits an initial increase in momentum of worm wheel 36 and other rotating parts in the power train so its inertia, when the lugs engage, results in a hammer blow effect upon the rotatable nut unit 32. This hammer blow assists initial opening movement or "cracking" of the valve as it is commonly termed in the art.

The worm wheel 36, and the nut unit 32, constitute the output portion of control assembly 30 and, through mechanism to be described, the worm wheel can be rotated either by manual operation of a handwheel 42 or powered operation of an electric motor 44. Normally, the motor is in drive engagement, but a special transmission and clutch mechanism permits initiation and maintaining of handwheel operation to the exclusion of motor operation so long as subsequent drive torque is applied through the handwheel. During electric motor operation of the valve control assembly, the motor circuitry is under control of a torque limit switch assembly and valve position limit switch assembly. The circuitry for the electric motor operation is not per se a part of this invention and accordingly is not shown herein. However, a suitable circuitry disclosure is included in copending application Serial No. 97,821 filed March 23, 1961.

The valve control 30 will be described with reference primarily to FIGURES 4, 5 and 6 from which it is clearly apparent that the assembly has a compact, compartmented base structure consisting of housing 50, a side cover 52 and a top cover 54. Housing 50 encloses and, with top cover 54, provides bearing support for most of the power train components. A shallow recessed side wall 56 of housing 50 with the side cover 52 completely forms a compartment and support for the electrical circuit components, effectively isolating them from the power train components.

Accessible at one end of the main housing 50 is the handwheel 42 and a clutch shift lever 60. The electric motor 44 is mounted on the opposite housing end wall 64. A handwheel shaft 66 passes through and is journalled in a bushing 68 (see FIGURE 4) located in an auxiliary torque spring housing 70 which, as seen in FIGURE 5, is secured to the main housing end wall 72 by screws 74. Through mechanism to be later described, selected operation by either the handwheel 42 or motor 44 will result in rotation of the main worm 80, FIGURES 5 and 6.

*Drive nut assembly*

The valve operator of the present invention, as specifically disclosed, is exemplified by a reciprocal, non-rotatable stem type of gate valve. It is to be understood that the same operator could be used for an axially fixed rotatable stem type of gate valve, in which case the wear sleeve insert 34 will have internal splines rather than threads.

With continuing reference to FIGURE 6, the base of housing 50 is provided with a thick annular pad 82 adapted to be secured to the mounting flange 84 (FIGURE 1) of yoke 26 by screws 85 which thread into tapped bores 86 in the housing pad. Centrally located in the pad 82 is an aperture 88 and surrounding the external side of the aperture is an annular recessed flange 90 which spigots into a matched annular recess (not shown) in the valve yoke flange 84, thereby accurately locating the valve control assembly 30 relative to fixed valve structure and thus locating the valve stem axis coaxial with the drive nut unit 32. The recess 92 in housing pad flange 90 provides space for and retains an oil seal 94.

Drive nut unit 32 is a composite assembly including a drive sleeve 96 which contains the removable nut wear sleeve 34. Drive sleeve 96, in the exemplary embodiment, is vertically supported in axially fixed disposition between the main housing base 82 and the housing top cover 54, being rotatably journalled coaxial with the aforenoted base pad aperture 88. The lower end of drive sleeve 96 projects through the inner race 98 of a tapered roller bearing 100, which seats against a shoulder 102 near the lower end 104 of the drive sleeve, the lower drive sleeve end projecting through the base pad aperture 88 and the oil seal 94 which provides a fluid seal between the interior and exterior of the housing past the rotatable drive sleeve 96. The outer race 106 of lower bearing 100 is accurately located within a recess 108 coaxial with the housing base aperture 88 and seats against shoulder 110 of the recess. As will be understood by those skilled in the art, a shim 112 or shims may be placed between the bearing outer race 106 and shoulder 110, as required.

The exterior of drive sleeve 96, above the shoulder 102, has two stepped down portions 114 and 116, portion 114 mounting the worm wheel 36 and the upper end portion 116 providing the upper journalled mounting of the drive unit 32. A spacer 118 is disposed over the upper drive sleeve end 116 and abuts a shoulder 120 between portion 114 and portion 116. An upper tapered roller bearing 122 fits over the drive sleeve end 116 with its inner race 124 abutted against the end of spacer 118. Thus assembled, the upper drive sleeve end 114 and upper bearing 122 are situated within a larger circular opening 126 in the top wall 128 of housing 50. Circular opening 126 is accurately located coaxial with the lower wall aperture 88, is of sufficient dimension to permit removal of the drive unit 32 with worm wheel 36 and is covered by the top cover 54.

Top wall cover 54 is centrally apertured at 134 and has a depending annular flange 136 with an external spigot portion 138 accurately fitting within the circular top wall opening 126. The depending cover flange 136 is counterbored to provide a first seat 140 which receives an upper oil seal 142 engaging the upper end 116 of the drive sleeve 96, and a second recess and seat 144 which receives and locates the outer race 146 of the upper bearing 122. When cover 54 is in place and bolted to housing 50 by screws 148, the drive nut assembly 32 will be axially fixed and accurately coaxially journalled relative to both the upper cover and the lower housing aperture 88 and thus, when the housing 50 is secured on the valve 20, the drive nut assembly will also be maintained coaxial with the valve stem 28. As previously noted, the disclosed embodiment has the wear insert 34 provided with internal threads 150 cut to match the threads on a non-rotatable type of valve gate stem so rotation of the nut assembly 32 will raise or lower the stem and the attached valve disc. In such an installation, the valve stem, in raised position, projects through the aperture 134 in the top cover 54; however, if the control assembly 30 is used on a valve with an axially fixed rotatable stem and a rising gate, the stem will not be raised through the cover and a plug (not shown) can be used to close the cover opening 134.

As has been briefly described, the driving worm wheel 36 is axially positioned with a free running fit on the intermediate stepped part 114 of drive sleeve 96 between a shoulder 154 and the lower end of the spacer 118 and in assembly is meshed with the worm 80. Lost motion is provided between the worm wheel 36 and drive sleeve 96 to permit the motor and gears to develop momentum to impart a hammer blow to break the valve gate loose from the seat. FIGURE 6A shows the hammer blow lugs 38 and 40 in section. The aforedescribed 270 degrees of free motion before contact of the lugs permits more time to accelerate than provided by some of the prior art assemblies and therefore gives a much more effective hammer blow. Using single lugs results in a single impact and driving contact engagement between lugs, thus machining of the lug contact surfaces is not required as is true when two sets of lugs are used.

*Wear Sleeve.*—The nut wear sleeve 34 is removably carried coaxially and non-rotatably within drive sleeve 96, and is inserted through the bottom end of the drive sleeve. The cylindrical through bore 156 of drive sleeve 96 is stepped down at the upper end forming a shoulder 158 as an abutment for the upper end of the wear sleeve 34. Near its lower end, the drive sleeve through bore 156 is axially splined at 160 to mate with axial external splines 162 on the lower exterior portion of wear sleeve 34. A sleeve nut 164, threaded into the lower internally threaded end 166 of drive sleeve 96, abuts and axially maintains the nut wear sleeve 34 within the drive sleeve 96 so the two sleeves constitute a rigid unitary assembly. Removal of the bottom sleeve nut 164 is permitted without disassembling the drive sleeve journal mounting or the meshed cooperation of its worm gear wheel 36 with the worm 80, thus permitting assembly or removel and replacement of the wear sleeve insert 34 without disassembly of any of the other components of the valve control assembly.

It has been previously proposed to use a removable wear sleeve, an advantage of which is that the sleeve blank can be shipped to the valve manufacturer for threading and can be installed into the valve control at the same plant rather than sending it back to the valve control manufacturer for finish machining and assembly as was and in cases is still required for a one-piece nut integral with or welded to the drive sleeve. Also, if the valve control assembly is changed from one valve to another with a different stem, a new nut insert can be threaded by the valve manufacturer and the valve control assembly can be removed from the first valve and the wear inserts changed or installed on the second valve by the user. The present invention utilizes a removable wear sleeve enabling both of the above features. A primary difference over previously known removable inserts is in the structural inter-relationship enabling the wear insert 34 to be inserted from the bottom of the assembly 30.

Top insertion, as was previously known, permits removal of the wear sleeve without removing the valve control from the valve yoke. The intended advantage was to permit changing worn sleeves without lifting the heavy valve control. From past experience it is now known that replacement of a nut insert during the life of the valve control because of wear is substantially negligible. An important advantage of bottom insertion of the wear sleeve nut not present with top insertion is that the bottom location of splines which non-rotatably secure the sleeve insert to the drive sleeve permits the use of standard internally splined drive sleeves and a simple splined coupling to engage the stem of and to drive plug or butterfly valves.

Locally, the next portion of this description would proceed to the worm 80 and its mounting; however, because the worm mounting is dependent upon mounting of other power train transmission components, as is apparent in FIGURE 5, the input side of the drive trains will be next described, followed by a description of the clutch and transmission mechanism and thence describing the driven worm 80.

*Dual input operators*

*Motor.*—Previously known conventional valve operators have utilized motors with housings provided with special flange mounts in order to secure the motor on the valve operator housing. Such an approach results in a large tooling investment with consequent higher costs for the original valve control assembly and also for stocking and replacing of special motors for many different sized valve controls.

With reference to FIGURES 4 and 5, the present invention uses a commercially available electric motor 44 with standard mounting "C" flange bolted to an adaptor plate 170 in the manner described in my aforementioned copending application Serial No. 97,821. A gasket 172 is used between the face of adaptor plate 170 and the mounting flange of motor 44. The adaptor is secured on the valve control housing end wall 64 by screws 174 (see FIGURES 1 and 3) threaded into the housing, and a second gasket 176 disposed between the adaptor plate 170 and housing end wall 64. As shown in FIGURE 5, an aperture 178 through the adaptor plate 170 aligns with the motor leads 180 permitting their passage through a passage 182 in control housing end wall 64 and into the aforedescribed side wall recess 56 for circuitry connections to various terminal blocks and switches which will be hereinafter described. The two motor lead passages 178 and 182 are thus isloated from the interior of and the drive components within control housing 50 and from external water etc. being sealed at joints by gaskets 172 and 176.

In FIGURE 4, the motor drive shaft 184, which is wholly journaled within the motor housing, projects through an oil seal 186 which is press fit into a central aperture 188 in the adaptor plate 170. Carried on the reduced end 190 of motor shaft 184, and non-rotatably secured thereto by a key 192, is a pinion gear 194. A locknut 196 and bent tab lock washer 197 maintain the pinion gear on the motor shaft.

Adaptor plate 170 constitutes one wall of a transmission and clutch compartment 198, adjacent the motor end wall 64, formed by an intermediate partition 200 in the control housing 50. An access opening 202 (FIGURE 4) in the control housing top wall is covered by a plate 204 and enables inspection of the transmission components without removing the top cover 54 or motor adaptor 170. Cover plate 204 is fastened by screws (not shown).

*Handwheel Input.*—Partition wall 200 serves to support the mountings for several component assemblies, one of which is the manual input assembly including the handwheel 42 and its shaft 66. The hub 206 of handwheel 42 fits on and is secured to the reduced end 208 of handwheel shaft 66 by a key 210, the handwheel being retained on shaft 66 by a retaining ring 212.

As has been described hereinbefore, the handwheel shaft 66 projects through a sleeve bushing 68 press-fit in an aperture 69 through the end wall of torque spring retainer housing 70. An oil seal 214 is press-fit into an exterior recess 216 around the retainer aperture 69 to provide a fluid seal between the handwheel shaft and the retainer housing. Seen in section in FIGURE 6, the handwheel shaft 66 is disposed horizontally past the drive nut assembly 32 and above the drive worm 80, projects through an aperture 218 in partition wall 200 and terminates within the transmission compartment 198 opposite the end 190 of the motor shaft. Shaft 66 is parallel to but not necessarily aligned with the motor shaft.

Partition wall aperture 218 has a shoulder 220 adjacent one of its ends which serves as an axial limit abutment for the outer race 222 of a ball bearing 224 held in the aperture by a retaining ring 226. Reduced end 228 of handwheel shaft 66 fits into the inner race 230 of the bearing 224 with a shoulder 232 of the shaft abutted against one side of the inner bearing race. A large diameter spur gear 234 is non-rotatably secured on the terminal end portion 236 of the handwheel shaft by a key 238, and is axially maintained on shaft 66 by a retaining ring 240. The hub of gear 234 clamps the inner bearing race 230 against the shoulder 232 on handwheel shaft 66 to position and retain the handwheel shaft and gear 234 against axial shift.

Both the handwheel gear 234 and the motor gear 194 are located within the transmission and clutch compartment 198 on parallel axes and in axially fixed disposition adjacent opposite ends of the compartment, but as has been stated need not be coaligned.

*Transmission and Clutch.*—The transmission components are arranged and interrelated to result in normal maintenance of a drive connection through the transmission from the motor 44 to the drive worm 80. Clutch actuation is accomplished when handwheel drive of the valve control assembly is desired. A light external hand pressure is applied to a clutch lever and held until the handwheel is rotated. With a light turning effort continually applied on the handwheel, the handwheel drive train through the transmission remains in operation and the clutch lever may be released. As soon as turning effort on the handwheel is released, the clutch will automatically shift to disengage the handwheel and engage the motor drive train. It is of importance from safety standpoint that the motor be de-clutched during handwheel operation. In some of the previously known valve controls, the motor is rotated by the handwheel during handwheel operation even though intended operation declutches the handwheel during motor operation. Such a control relationship is hazardous to an operator.

The foregoing selective and automatic clutching operation is accomplished by mechanism best shown in FIGURE 5, although meshing of the motor gear and handwheel gear with the clutch input gears is shown in FIGURE 4, and an exploded view of the components is presented in FIGURE 7.

The helical clutch and gear assembly 250, as shown in FIGURE 5, consists of a clutch shaft 252 with one end 254 piloted within the inner race of a ball bearing 256 disposed in a socket embossment 258 on the inner face of the motor adaptor plate 170. External splines 260 on the opposing end of clutch shaft 252 fit within the end 262 and engage with internal splines 264 of an axially fixed, rotatably mounted spline sleeve 266. The spline sleeve 266 is quite short and is supported at its two reduced diameter ends 262 and 268 by ball bearings 270 and 272. Bearing 270 is received against shoulder 276 of recess 274 formed in a hollow cast protrusion 278 of partition 200, the reduced end 268 of spline sleeve 266 spigots into the inner race of bearing 270, the other bearing 272 is placed over the other end 262 of sleeve 266 and fits into recess 280 in partition wall 200, and a retaining ring clip 282 maintains the bearing 272, sleeve 266 and bearing 270 in axially fixed disposition.

Clutch shaft 252 has three distinct sections between its two ends 254 and 260. The intermediate section 284 supports an axially slidable clutch member 286 and has external axial splines 288 which mate with internal axial splines 290 on the clutch member. Washers 292 and 294 and sleeve bushings 293 and 295 are placed on respective end sections 296 and 298 of clutch shaft 252 and combined clutch and gear elements 300 and 302 are rotatably carried by respective bushings 293 and 295. A washer 304 is placed between the bushing 293 and the end of spline sleeve 266 and axially maintains the handwheel clutch-gear element 300 on its bushing with a free running fit. Similarly another washer 306 is placed on clutch shaft end 254 between the inner race of bearing 256 and bushing 295 to axially maintain the motor clutch-gear element 302 on its bushing with a free running fit.

Clutch assembly 250 has a sliding jaw type of clutch which can selectively couple one of two input drives to a single output drive, clutch elements 300 and 302 representing inputs and slidable clutch member 286, together with the splined clutch shaft 252, representing the output.

Input element 300 (the handwheel drive input) includes a small spur gear 312 which is meshed with the previously described handwheel gear 234 (FIGURE 4). Circumferentially arranged on the side of element 300 which faces the sliding clutch element 286, are axially projected jaws 314 adapted to be engaged by complementary jaws 316 on the sliding member 286. These jaws 314 and 316 have a special shape as will be described.

The other input element 302 (the motor drive input) includes a large helical gear 318 which is meshed with the motor pinion gear 194 (FIGURE 4). On the side of element 302 which faces the sliding clutch member 286 are axially projected clutch jaws 320 adapted to be engaged by complementary jaws 322 on the sliding clutch element 286. The jaws 320 and 322 are straight sided for operational reasons to be described.

Between the opposite ends of the sliding clutch element 286 is an annular groove 324 which receives the arms 326 of a clutch operating fork 328. Fork 328 has a collar-shaped base member 330 apertured at 322 in a direction transverse to the fork. It is not pivotally mounted, rather it is slidably mounted by means of the collar member 330 on a rockable clutch operating cam shaft 334 which is disposed parallel to the clutch shaft 252. Cam shaft 334 horizontally extends from one of its ends 336 adjacent the torque spring retainer housing 70 to the motor adaptor mounting plate 170, passing through a bore 338 in valve control housing end wall 72, through a second bore 340 in partition wall 200 and terminating in a reduced end 342 which passes through a tolerance washer 344 and is disposed in a fluid bore 346 in the adaptor plate 170. The cam shaft 334 fits in the various bores 338, 340 and 346 with a free rockable fit being axially positioned by a retaining ring 348 in an annular groove in the cam shaft 334 located adjacent partition wall 200 and the shoulder 350, provided by reduced end 342, abutting the tolerance washer 344. As will be apparent, the thickness of washer 344 determines the clutch jaw clearance in the motor drive position.

Shown in FIGURES 1, 2, 4 and 5, a cam shaft operating lever 60 is rigidly and non-rotatably secured to the exterior cam shaft end 336 by a key 352 and a set screw 354. Near the other cam shaft end 342, and located between the base 330 of clutch shift fork 328 and the adaptor plate 170, is a cam member 356 which is apertured at 358 to fit and is non-rotatably and axially fixed on cam shaft 334 by a headed pin 360 held in place with a cotter pin.

Cooperation between the clutch fork arms 326 and the groove 324 of the shiftable clutch element 286 and the location of the fork base 330 on shaft 334, prevents any rotation or angular movement of fork 328 relative to the cam shaft 334. A clutch biasing coil compression spring 370 slightly compressed between the partition wall 200 and the clutch fork base 330 biases the clutch fork 328 axially relative to shaft 334 to an abutment of the fork base 330 against the cam member 356. In this position the clutch jaws 320 and 322 are engaged for motor drive. Spring 370 is maintained in position by a pin 372 in the fork base and a stud-shaped set screw 374 fixed in partition wall 200.

Although the major extents of the facing surfaces of cam member 356 and fork base 330 are flat and parallel, a side sector portion of cam member 356 includes an axially directed helical cam rise 376 which, upon rocking motion of the cam shaft 334, engages a cam follower 378 projecting axially from the side face of the clutch fork base 330. Continued rocking movement of the cam shaft will cause the clutch fork 328 to shift (to the right in FIGURE 5) along the cam shaft 334 against the force of bias spring 370.

Normally, spring 370 pushes against clutch fork 328, which in turn pushes clutch member 286 against the jaws of motor driven gear 318. As has been described, in the motor drive clutching position, clutch member 286 has straight sided jaws 322 which engage corresponding straight sided jaws 320 on motor drive clutch input gear 318. The helix angle of cam surface 376 at the periphery of the cam 356 is approximately 45 degrees for maximum efficiency. When lever arm 60 is pushed downward about 30 degrees, cam member 356 rotates with the shaft 334, but the shaft and cam are held against axial movement by pin 360 and washer 344. Clutch fork 328 must then move axially to the right until clutch member 286 meshes with the handwheel driven gear 312. The jaws 316 at this end of the clutch member 286 and the jaws 314 on gear 312 are undercut dovetail type with an undercut angle of about 45 degrees. When handwheel 42 is thereafter rotated in either direction, gear 234 will rotate and in turn will rotate the pinion 312 on its bushing until the dovetailed clutch jaws 314, 316 interlock and drive. So long as the tangential load on the clutch jaws 314, 316 due to handwheel torque is equal to or greater than the axial bias force on clutch element 286 due to spring 370, the clutch assembly 250 will remain in handwheel driving position without the need for maintaining pressure on cam shaft lever 60 and the valve may be operated manually without also simultaneously rotating the motor 44. When torque on the handwheel 42 is released, clutch spring 370 will instantly return the slidable clutch member 286 to its motor drive position.

Shown in FIGURE 6 on clutch lever shaft 334 is a torsion spring 379, one end of which rests against housing wall 56 and the other end being hooked around a screw 380 in the lever shaft 334. By means of spring 379 the clutching hand lever 60 does not stay down during handwheel operation but is biased back to the up position when the operator releases hand pressure on the lever 60. Later when the handwheel is released, no movement occurs at lever 60.

In some installations an electrical interlock is required to prevent inadvertently starting the motor 44 while the control is in its manual drive condition. For this function, the clutch fork base 330 may have another cam surface 386, operable during axial shift of the fork to actuate an electrical interlock contact switch block 388 by means of a push rod 390. The switch block 388 is mounted in recessed control housing wall 56 on an integral boss extension 392 through which a bore 394 enables passage into the housing compartment 198. The push rod 390 projects through bore 394 and the end of boss 392 is counterbored at 396 to receive an oil seal 398 surrounding push rod 390. Switch block 388 is secured on the boss by means such as screws (not shown). Switch block 388 can be connected directly in series control with the motor control circuits in any well-known manner. With the clutch assembly in its spring biased motor drive position, the switch block 388 will close the motor control circuit. In handwheel drive position, the switch block 388 will be open, breaking the motor control circuit and preventing operation of the motor 44. This feature is optional. In normal service, mechanical declutching of the motor is adequate.

The disclosed handwheel clutch utilizes a much lighter and different spring arrangement than prior art devices. It need not be a heavy spring inasmuch as the slidable member of the clutch is very light having no integral gears. Furthermore the distance needed for travel of the slidable clutch member is minimal since neither the handwheel gears nor the motor gears come out of mesh and the sliding clutch member returns to a motor drive position when the motor gears are at rest. The motor gear set 194, 318 is illustrated using straight spur teeth for convenience in illustration. It is preferred however, that the motor set gears 194 and 318 have helical teeth. Also the motor gear set can readily be provided in several ratios and will be less costly to carry in inventory than are the motor driven gears in previously known clutching mechanisms between motor and handwheel drives. The handwheel shaft 66 is supported on only two bearings 68 and 224, as distinguished from some previously known mechanisms where the handwheel shaft is supported on three or more bearings. The worm shaft 80 is also supported at two points, at bearing end 408 and spline end 402 as opposed to other worm shafts supported on three or more bearings. The latter is a poor arrangement for several reasons. It is more costly and has a built-in inherent danger of binding due to multiple chances for misalignment and eccentricity of the three or more bearing shaft portions.

On worm 80, the left hand shaft end 404 (as seen in FIGURE 5) is externally axially splined at 406 and provides the aforedescribed non-rotatable engagement within the internal splines 402 of the spline sleeve 266 with freedom to permit axial shift of the worm. Worm 80 engages with the worm wheel (or gear) 36 (see FIGURE 6).

The opposite shaft portion of worm 80 terminates in a reduced diameter threaded end 408 providing an annular bearing abutment shoulder 410 against which the inner race 412 of a ball thrust bearing 414 is clamped by a nut 416 on the threaded shaft end 408, the nut being secured by a bent tab lock washer 418.

Bearing 414 is axially fixed within a cylindrical recess 428 in the annular cylindrical body 432 of a thrust bearing retainer 430, the outer bearing race 420 being received within and abutting an annular shoulder 434 in the cylindrical retainer recess 428 and being maintained in position by the spring clip retainer ring 436. The annular edge 438 of the retainer body 432 provides an actuating abutment for the torque limit switch actuator as will be hereinafter described.

The cylindrical portion 432 of bearing retainer 430 slidably fits within a cylindrical opening 440 through the control housing end wall 72, the opening 440 being coaxial with the spline sleeve bearings 270 and 272 and of sufficient length to permit and assure a guided axial shifting of the retainer 430 with the worm 80. The end face of retainer 430 has a short concentric stub 442 with a threaded bore 444 coaxial with bearing recess 428. A stud 446, of smaller diameter than the retainer stub 442, is threaded into the bearing retainer bore 444 and secured in position by a set screw 448, the stud shank then projecting through the aforedescribed torque spring retainer housing 70, which is annular and can be substantially cylindrical.

The spring housing 70 is secured on the control housing wall by screws 74 and is coaxially located by an annular spigotted coaction with the opening 440. The inner end of the spring housing has an annular inwardly projected radial flange 450 which surrounds the bearing retainer stub 442 with a slight clearance and, in the normal axial position of the worm 80, the end face 452 of the bearing retainer stub and the interior face 454 of the spring retainer flange 450 will be disposed in a common plane transverse to the stud 446. A thrust spring washer 456 fits with a free sliding fit over the stud 446 and is adapted to abut both of the aforenoted planar faces 452 and 454 when worm 80 is in its normal position. A heavy compression coil thrust spring 458 is disposed over stud 446, seated on thrust washer 456 and is retained on the stud by a second thrust washer 460 placed over the stud and also having a free sliding fit relative to the stud 446. The end 462 of stud 446 is threaded and is of reduced diameter providing a flat radial shoulder 464 against which is secured a retaining washer 466 of smaller diameter than thrust washer 460 but of larger diameter than the main body of stud 446. Retaining washer 466 is secured on stud end 462 by a castellated nut 467 and cotter pin and forms a planar seat for the second thrust washer 460, the seat being coplanar with the flat stud shoulder 464. A spring housing end cap 468 with an inner recess 470 of sufficient diameter and depth to permit an axial shifting movement of the stud end 462, retaining washer 466 and the nut 467, has a mounting flange 472 by which the cap is secured on the end face of spring housing 70 with screws 474. Normally, a gasket is used between cap 468 and housing 70 and the end face 476 of the flange 472 lays in the same plane as the stud shoulder 464 when the worm is in normal position. The inner diameter of the cup flange end face 476 is less than the outer diameter of the thrust washer 460 and serves as a second seat for the second thrust washer 460.

The disclosed construction enables overload torque response for both directions of rotation of the power train. As the thrust of valve stem 28 increases due to an obstruction to or seating of the disc 27 (FIGURE 1), worm wheel 36 will cease rotation and worm 80, when rotated under continued application of power, will shift axially and push against torque spring 458 through thrust bearing 414, bearing retainer 430 and thrust washer 456, the other thrust washer 460 being seated against the end cap 468. As the bearing retainer 430 moves, without rotating, to compress spring 458, a spring-loaded arm 490 on a torque switch assembly 492 which is directly responsive to axial movement of the bearing retainer will move. Torque switch assembly 492 will be fully described hereinafter but it is here noted that it has adjusting screws to pre-set the positions or torques at which its respective normally closed switches are opened. The worm 80 slides toward the spring 458 when the disc 27 is seating in the closing direction to compress spring 458 toward the right in FIGURE 5. Open gate seating (the limit in opening direction) moves the worm 80 away from the spring 458 which will also compress the spring 458 although in this instance the thrust washer 456 seats against the face 454 of spring housing flange 450.

During valve opening and closing operations, the motor 44 transmits rotation to the worm 80 through gears 194 and 318, clutch element 286, clutch shaft 252 and spline sleeve 266 and during compression of spring 458 the spline sleeve 266 continues to transmit torque to worm 80 as the worm shifts axially in either direction.

A clearly shown in FIGURE 5, the solid main drive worm and shaft is supported between closely spaced bearings 270 and 414 resulting in a minimal deflection due to side thrusts from a torque transmitting engagement with the worm wheel 36. The worm 80 is supported at only two points. The spline sleeve 266 is short and is supported by ball bearings 270 and 272 at only two points. The clutch shaft 252 is also short and is supported by ball bearings 256 and 272 at only two points. The worm 80, sleeve 266 and shaft 252 are all simple and relatively inexpensive to manufacture.

Although the use of a solid worm has been previously proposed, such use was with a milled slot through the end of the shaft to enable a driving connection. Such a slot has less torque capacity and more sliding friction than the presently proposed splined worm end. Other previously known installations have utilized a hollow bored and broached worm which slides on an axially fixed worm shaft. Such an installation requires a shaft which is relatively long, is splined in two places and is supported by three bearings which results in the previously noted inherent danger of shaft binding. In addition to increased possibility of 3-bearing binding, the design of a long hollow worm on a long spindle shaft is such that shaft deflection between bearings due to radial loads on the worm can readily cause binding between worm and shaft creating increased resistance to axial shift of the worm and cause erratic operation of the torque switch. Such previously known worm and shaft constructions are costly to manufacture as well as being poor designs for operation.

*Electrical motor control components*

All of the electrical control components are located for convenient access in the recessed side wall 56, the peripheral edge of the recess providing a rectangular flat faced mounting flange 496 engaged by the flat face of a mating flange 498 of the side cover 52. The cover 52 can be secured over the recess of wall 56 by screws (not shown) passing through holes 500 in the cover flange into threaded holes 499 in the side wall mounting flange 496. Alternatively or additionally, a bracket 502 with hinge ears 504 can be secured by screws to one side of the recess wall 56, the ears 504 cooperating with associated apertured hinge lugs 506 on the cover 52 and a removable hinge pin 508 to enable the cover 52 to be swung open for access to the control circuit components. A sealing gasket 510 is used between the cover 52 and the recess flange 496. This gasket may be deleted in the event an explosion-proof installation is desired.

Located within the recess are the electric motor clutch interlock switch block 388, a position limit switch assembly 520, the torque limit switch assembly 492 and a terminal block 522 with multiple terminal connections enabling convenient connection to external control circuit components. To accomplish the compact arrangement of the several components, the terminal block 522 is supported on a bridge-shaped bracket 524, FIGURES 4 and 6, which straddles a portion of the torque limit switch assembly 492.

The clutch-motor interlock switch block, actuation of which has been previously described, is per se a commercially available off-on switch having an actuator pin spring biased to the on position. In assembly in the valve control the switch pin presses the operating plunger 390 into engagement with cam surface 386 on the clutch fork collar 330. Switch 388, as will be clearly understood by those skilled in the art, will be connected in series with the motor electrical control circuit. As previously indicated, this switch is used only in special applications for the double safety feature of preventing any rotation of the motor when in handwheel clutch position. Normally the mechanical declutching is adequate and inadvertent starting of the motor will cause no damage.

*Torque Switch Assembly.*—The torgue switch assembly 492 is shown in assembly in FIGURES 4, 5 and 6 and will be described in detail with reference to FIGURES 8–12.

Standard, commercially available upper and lower switch contact blocks 526 and 528 are used for the switch elements and enable reduced procurement problems, decreased cost and use of available proven switch constructions. Each switch block 526 and 528 is spring biased to one position and a pin (not shown) is pushed into the switch block against the spring bias to change the switch contact positions. The type of switch contact arrangement will depend upon the control circuit dictated by the valve installation.

Actuation of the switch blocks 526 and 528 is accomplished by rotation of a shaft 530 connected to cams 532 and 534 which engage and shift upper or lower switch operating pins 536 and 538 against the internal spring bias of the associated switch blocks. The operating shaft 530 is secured by a small taper pin 540 to the aforedescribed crank arm 490 which in turn is actuated by shifting of the non-rotating worm thrust bearing retainer 432, the crank arm 490 being held against the annular abutment edge 438 of the retainer 432 by a coiled torsion spring 542, as will be fully described. Also, as will be described, the torque switch assembly includes mechanism by which the limit actuation position of both switch blocks can be individually, finely adjusted.

The torque limit switch assembly 492 is a unitary assembly of components mounted upon a support spider 544 (shown in section in FIGURE 8) which has a circular base plate 546 with a flat mounting face 548 having a concentric cylindrical protrusion 550 with an annular O-ring retaining groove 552 formed in its periphery and carrying a sealing O-ring 554 in the groove 552. When assembled on the valve control 30 (see FIGURE 5), the cylindrical protrusion 550 spigots into a complementary cylindrical opening 556 in recess wall 56 and the O-ring 554 is deformed into resilient sealing engagement between the spider base plate protrusion 550 and the wall opening 556. A small diameter boss 558 projects concentrically from the cylindrical spigot protrusion, a large diameter boss 560 projects from the opposite side of the base plate 546 and a coaxial through bore 562 extends through both of bosses 558 and 560. The aforedescribed operating shaft 530 projects through the bore 562 with the hub 564 of crank 490 abutting the end face of small boss 558. In final assembly (FIGURE 5), the abutment end or throw 566 of crank arm 490 lays in the path of and engages the annular abutment edge 438 of the worm thrust bearing retainer 432.

Shaft 530 is grooved at an intermediate position 568 to carry an O-ring seal 570 which engages and seals against the wall of through bore 562, the shaft projecting on past the flat end face 572 of the large boss 560.

The two cam plates 532 and 534 are identical, one being illustrated and described with reference to FIGURE 12. Plate 532 is apertured at 574 to be disposed with a free running fit over the cam shaft 530. A spur gear sector 576 (577 on front cam) of approximately 80° is cut on a radially extended arcuate periphery of the cam plate concentric with the aperture 574. The camming surface of each plate consists of small sectors of neutral position circular arc 578 with inclined radial cam rises 580 and 582 at either end of the arcs 578. The two cam plates 532 and 534 are placed together on the shaft 530 but are approximately 180° opposite in relative angular position. One plate rests against the flat end face 572 of the large boss 560 and the cam shaft 530 rotatably projects completely through both cam plates. Both plates 532 and 534, the cam shaft 530 and crank 490 are retained as a unit on the base spider 544 by the hub 592 of a double arm adjustment and connection member 590, the hub 592 being apertured at 594 to fit over the end of shaft 530 and secured thereon by a taper pin 596.

Adjustment and connection member 590 has diametral arms 598 and 600 through which independent adjustable direct connections are made from the rotatable cam shaft 530 to both of the respective cam plates 532 and 534. At the end of each arm is a support finger 602 (on arm 598) and 604 (on arm 600), the two fingers projecting past the gear sectors on the cam plates, toward the spider base plate 546. Each finger carries a small worm 606 (on finger 602) and 608 (on finger 604).

Worm 606 and 608 and their mounting arrangement in respective fingers 602 and 604 are substantially identical and only one, worm 608, will be described. The threads of worm 608 are formed on the cylindrical periphery of the head of a bolt, the shank 610 of which projects through an aperture 612 in finger 604. Shown in FIGURE 8, the finger 604 is inclined slightly away from parallel disposition relative to the axis of shaft 530 and such inclination skews the axis of worm 608 sufficiently from the plane of the associated cam plate 534 so that straight spur teeth may be used on the cam plate gear sector 577. The shank 610 of worm 608 passes freely through aperture 612 and its threaded end receives a nut 614 which, with a lock washer 616, is used to clamp the worm 608 in adjusted position. When nut 614 is loosened, the worm 608 may be rotated by means of a screwdriver kerf 618 in the worm head and such rotation, through meshing of the worm and the cam plate gear sector teeth 577 will rotate the cam plate 534 relative to the crank shaft abutment 566. Worm 606 is located closer to the spider base plate 546 than is worm 608 because it is meshed with the rear cam plate 532; otherwise, it is mounted similarly to worm 608 and adjusts the position of its cam 532 relative to crank shaft abutment 566 in a manner similar to worm 608.

Protruding substantially perpendicular from the base plate 546 of spider 544 at diametrical positions near the periphery are two switch block mounting pads 620 and 622. As illustrated, pad 620 is at the top and pad 622 at the bottom. It is to be understood that the torque switch assembly will operate regardless of whether it is mounted vertically or horizontally or in any other position. Switch block mounting pads 620 and 622 extend beyond the cam plates 532 and 534 and past the midportion of the diametrical adjustment arm 590. With specific reference to FIGURE 8, the upper and lower pads have respective through bores 624 and 626 disposed perpendicular to the axis of shaft 530, bore 626 being aligned with the peripheral surface of rear cam plate 532 and bore 624 being aligned with the peripheral surface of front cam plate 534. Switch operating cam follower push pins 536 and 538 are reciprocally fitted in respective bores 624 and 626 and engage the low dwell arcs 578 of respective cam plates when the double arm is in a neutral position. Switch blocks 526 and 528 are secured to the outer faces of the pads 620 and 622 by screws 628 as seen in FIGURE 10 so the spring biased switch operating component (not shown) of each switch block bears against the end of its associated push pin 536 or 538 and resiliently urges the pins 536 and 538 against the cam plate peripheries.

The aforedescribed coiled torsion spring 542 is disposed around the large spider boss 560, is wound sufficiently to create described bias with one of the spring ends 630 tangentially protected in front of one of the switch block pads 622 as a fixed abutment and the other end 632 placed behind an adjustment arm finger 604 as the rotatable abutment. So disposed, spring 542 will create a counterclockwise resilient bias force on the arm 590, the connected cam plates 532 and 534, the cam shaft 530 and the crank arm 490 to resiliently maintain the crank arm abutment end 566 resting against the annular abutment edge 438 (see FIGURE 5) of the main worm shaft bearing retainer 430.

Concerning operation of the torque switch assembly 492, as has been previously described, the worm 80 and its bearing retainer 430 shift in one direction or the other depending upon the valve seating or unseating force becoming greater than the torque limits of torque spring 458. Depending upon the direction in which the sliding worm 80 shifts the shift is sensed by means of the torque limit switch crank arm 490 which, through cam shaft 530, causes or permits an angular increment of rotation of the torque switch adjustment arm 590. This arm 590, through the two adjusting worms 606 and 608, connects with and drives the two cam plates 532 and 534. In normal torque position, the switch block operating pins 536 and 538 rest in the low dwell radius sections 578 of the cam plates. If torque is exceeded in one direction, one cam raises a pin to operate one switch. If torque is exceeded in the other direction, the other switch is operated by the other cam. The adjusting worms 606 and 608, as has been described, are mounted at an angle to the plane of the cams so that straight spur teeth are used on the cam plates to permit generation of the complete cam profile, including teeth, in one operation in a "Fellows" Gear Shaper.

The cam plates 532 and 534 for each of switch blocks 526 and 528 are formed so that by simply changing the adjustment, either switch block can be caused to operate for either direction of operation. The top switch block 526, for instance, can be made to operate either in the valve opening or the valve closing direction. This factor also makes it possible to have both switches operate during valve movement in one direction to provide two different successive torque limit settings. This arrangement could be used to operate a two-speed motor at reduced speed in response to a light torque condition and then to completely stop the motor at a heavier torque limit position. It also makes it possible to select a heavy or light torque limit simply by activating the motor control through one or the other of the two switches.

*Position limit switch assembly.*—The position limit switch assembly 520 is a gear type limit switch assembly which utilizes a gear case assembly having a gearing arrangement similar to that in a previously known Cutler Hammer limit switch construction. However, the switch operating slides and the casing construction have been improved to make the unit more compact and to permit use of commercially standard switch blocks. Gear construction and operation will be but briefly described, however, a limit switch assembly with tandem cam-gear sets, operationally somewhat similar to the disclosed gear arrangement, is fully described in U.S. Patent No. 2,519,907 to H. E. Hodgson. In accord with the present invention, a novel adaptor plate is proposed for use with the switch gear case assembly in order to enable use of a standardized gear case unit in combination with various sizes of valve control units.

*Position limit switch assembly.*—Referring to FIGURE 13, the position limit switch assembly 520 includes a pair of control switches 650 and 652 secured to the assembly casing which contains a driving pinion 654 (FIGURE 15) and two sets of switch operating gears 656–658 and 660–662, the former set of gears being associated with switch 650 (the valve closed limit switch) and being normally connected to the driving pinion 654 through the medium of an idler pinion 664; and the latter set of switch operating gears being connected with switch 652 (the valve open limit switch) through the medium of an idler pinion 666. The above parts are housed within a casing consisting of a bottom plate 668 upon which is mounted the two switches 650 and 652, a back casing plate 670 and a front casing plate 672. The three plates are secured together by screws and the front plate 672 is spaced and disposed parallel to the back plate 670 by means of spacer sleeves 674 and screws 675. A metal cover 676 fits around the spacers 674, being clipped under the bottom spacers as illustrated by dotted lines in FIGURE 14. The front and back plates of the casing are provided with openings for receiving two parallel shafts 678 and 680 which rotatably journal the four gears 656, 658, 660 and 662 within the casing, with gears 656 and 58 enmeshed and gears 660 and 662 enmeshed. Assembly 520 will operate in any position and is shown inverted in FIGURE 4 with the switches on the upper side.

The unit is designed so both of switches 650 and 652 may be commercially available standard switch blocks of the type having reciprocable operating elements 680 and 682 respectively, illustrated in dotted lines in FIGURE 13. These reciprocable operating elements are spring biased in the direction of the dotted arrows (FIGURE 13) and pressure on the elements in a direction opposite to that of the arrows actuates the switch against spring bias to its opposite condition. Switch 650, being the closed position limit switch, has two normally closed contacts C—C and two normally open contacts D—D. Switch 652 being the valve open limit switch has two normally closed contacts B—B and two normally open contacts A—A. At the open limit, contacts A—A will close and contacts B—B are open. At closed limit contacts D—D will close and contacts C—C will open. As will be well understood by those familiar with valve operating controls, these switches can be conveniently wired into the motor operating circuit to provide appropriate motor control at valve closed and open limit positions.

Each set of the switch operating gears includes a cylindrical cam formed on one of its sides, each cam having a slot in its periphery, the slots 682 and 684 of the cams of gear set 660–662 being seen in dotted ines in FIGURE 14. The cam slots of operating gears 656 and 658 cooperate with two pins 686 fixed in an operating slide 688, shown more clearly in FIGURE 13A, reciprocably disposed in a vertical track 690 formed in the back casing plate 670. A similar slide 692 with cam pins 694 is reciprocably disposed in a vertical slide track 696 formed in the front casing plate 672. When a slide such as slide 688 shown in FIGURE 13 is shifted downwardly by coaction of its pins 686 with the slots in its associated operating gears, the pins 686 ride out of the slots and rest against the cylindrical cam surfaces of the gears. In such position a lower projection 698 of the slide 688 which engages the operating element 680 of the associated switch 650, is shifted downward a sufficient distance to actuate the switch against the switch spring bias. Reaction of this spring bias maintains the slide 688 biased upwardly against the cam surfaces of its respective operating gears so that, upon reverse rotation of the gears, the pins of the slide will pass into the slots and be drawn back in an upward direction permitting the switch to be self-biased to its normal position.

An operating slide biasing plate 700 extends laterally between the upper ends of the tracks 690 and 696 located in the back and front plates respectively. Biasing plate 700 is vertically guided on a stud 702 which is suitably fixed in a cross brace extending between the front and rear casing plates, and a light compression coil spring 704 encircles the stud and provides a bias urging the biasing plate 700 downwardly. Whenever one of the switch operating slides 692 or 688 is raised to its upper position the upper end of the slide will abut the biasing plate 700 urging it upwardly against the bias of coil spring 702. This cooperation provides a downward bias on the slides 692 and 688 which maintains their pins 694 or 686 against the periphery of the operating gear cam surfaces whenever the slides are in the upper position. Thus, whenever the gears are rotated to positions where the slots in their two cam surfaces permit reception of both pins in their respective slide, the biasing force will urge those slides downwardly so the pins fall into the slots and the slides are carried downwardly by continued rotation of the pair of gears. The downward movement continues until the slide pins are forced out of the cam slots in which position the slides have caused operation of their associated limit switches which in turn creates a spring bias upwardly against the slides again maintaining the pins against the cam surfaces as has been previously described.

The two pairs of switch operating gears 656, 658 and 660, 662 are normally connected to the driving pinion 654 through the medium of idler pinions 664 and 666 respectively. Each of the idler pinions are rotatably and axially maintained by retaining rings on axially slidable shafts 706 and 708, the shafts being selectively axially shiftable to disengage their respective idler gears 664 or 666 from meshed position with the driving pinion 654, while still maintaining them in meshed engagement with their associated switch operating gears 656 or 660. Each of the shafts 706 and 708 has a circumferentially grooved head 710 and 712 respectively, each head is provided with a screwdriver kerf and the two heads are located in front of the front casing plate 672 where they are readily accessible for adjustment.

Shown in each of FIGURES 13, 14 and 15 is a cam plate 714 which is pivotally secured on the front casing plate 672 by means of a pivot bolt 716. The cam plate 714 may be swung about the pivot bolt 716 through an arc determined by an accurate slot 718 through which is disposed a clamping screw 720. The periphery of cam plate 714 is provided with an intermediate neutral position 722 with camming portions 724 and 726 which are directed in opposed directions. The arcuate periphery of the cam plate is of such dimension as to fit within the grooved heads 710 and 712 of the two idler gear shafts 706 and 708, and when the cam plate is located in its midposition and clamped therein by means of the clamping screw 720, the neutral portion 722 of the camming periphery maintains the two idler gear shafts 706 and 708 in an axial position which maintains both idler gears 664 and 660 in constant mesh with the driving pinion 654. As before stated, the idler pinions always remain in mesh with their associated driving gears.

If it is desired to adjust the switch operating position of either of the driving gear sets relative to the driving pinion 654, the aforenoted cam plate 614 is loosened and shifted to one side or the other. For example, if the valve closed limit position must be adjusted, the idler gear 664 must be freed from meshing engagement with the driving pinion 654 by shifting the idler shaft 706 rearwardly. Therefore, the cam plate 714 must be pivoted clockwise and with reference to FIGURE 15, such a clockwise pivotal movement shifts the cam portion 724 into engagement with the grooved head 710 forcing the idler gear shaft 706 inwardly which disengages the idler gear 664 from the driving pinion 654. In such position, the valve closed limit gear set 656-658 may then be freely rotated to any desired position by means of a screwdriver inserted in the kerf of the head 710 of idler gear shaft 706. By shifting the cam plate 714 in the opposite direction the other idler gear 666 is disengaged from the driving pinion 654 and the open limit switch operating gear set 660-662 may be adjusted to its desired controlling position.

The driving pinion 654 is non-rotatably rigidly secured on a shaft 730 which is journalled in bushings in the front and rear casing plates 670, 672, the shaft 730 projecting from the rear casing plate 670 and having non-rotatably secured thereon a spur gear 732. The aforedescribed position limit switch gear case assembly, upon which are mounted the desired type of switch blocks, can itself be made as a standardized item adaptable for use with many different sizes of valve control assemblies merely by the use of appropriate sizes of adaptors one of which is clearly shown in cross section in FIGURE 13.

The adaptor 736 is a casting, one end of which is provided with a cup-shaped chamber 738 having an annular wall 740 terminating in a radial flange 742 by which the adaptor 736 is secured to the gear casing rear plate 670 with screws 744 (FIGURE 14). The annular adaptor wall 740 is provided with a second annular radial flange 746 intermediate its base wall and the first flange 742, flange 746 having suitable mounting apertures 748 at circumferentially spaced positions enabling the position limit assembly 520 to be secured in position on the recessed wall 56 with screws 750 (see FIGURE 5). The base wall of the cup-shaped chamber 738 has an offset annular cylindrical formation 752 provided with a circumferential groove 754 carrying an O-ring seal 756. This cylindrical portion 752 is accurately machined and provides a locating spigoted fit within a matching accurately shaped cylindrical hole 758 in the valve control casing recessed wall 56 (see FIGURE 5).

Shown in FIGURE 13, a cylindrical sleeve 760 projects from the rear of the adaptor chamber 738 excentrically with a cylindrical surface 752, and the sleeve 760 includes a through bore 762 accurately located with respect to the cylindrical spigotting surface 752. Journalled in the through bore 762 is a position take-off drive shaft 764 which non-rotatably carries a small pinion gear 766 on its end which is disposed within the adaptor chamber 738. The pinion 766 abuts a washer 768 which bears against an inner annular end face of an oil seal boss 770 which is counterbored to provide a chamber for an oil seal 772. The terminal end of the sleeve bore 762 is also counterbored to receive a sleeve bushing 774 which positions and takes up any side thrust which may occur at the immediately adjacent gear take-off point. The exterior end of the take-off shaft 764 is provided with a worm gear 778 and a hub 776 which rests against a step on the shaft 764 providing a slight amount of axial clearance for shaft 764 and clamped by means of a washer and a nut 780. In FIGURE 5, the worm gear 778 is not shown, however, in assembled position, the worm gear 778 and adaptor boss 760 project through an opening 782 in the spline sleeve retainer 278 so that the worm gear 778 will mesh with the position take-off worm threads 400 on the exterior of the spline sleeve 266. Accordingly, rotation of the spline sleeve will directly result in a corresponding direction of rotation of the position limit switch assembly 520.

Operation of the position switch mechanism 520 is smoother and more reliable than that of "counter" type position limit gearing used by some previously known mechanisms, relying on fewer coacting parts. Operation is accomplished by means of the short rigid pins in each slide which rest on and operatively coact with the slotted hubs of the two associated meshing gears. One of the gears has 31 teeth and the other has 30 teeth. Hence, every 30 revolutions of the 31 tooth gear, the slots in the two hubs line up and can receive the two pins on the slide assembly pulling it through to the opposite side of the hubs. At each end of slide travel, spring pressure keeps the slide pins in contact with the gear hubs. The pinion gearing in this assembly is used to give additional gear reductions in addition to providing the aforedescribed separate declutching of each slide drive for setting or adjustment of the number of turns to actuate each switch.

The worm thread 400 on the outside of spline sleeve 266 meshed with the small worm gear 778 which in turn drives the gears in the limit switch assembly 520. The gearing can be set to operate each limit switch 650 and 652 at any point in the opening or closing directions to cut off the motor and/or operate indicating lights or interlock with other valves. If desired, a 4-train limit switch assembly can be mounted in the same position to provide independently adjustable limit switches to operate at four (4) positions during the stem travel.

The aforedescribed valve control 30 can easily be made explosion-proof by omitting the gasket under the switch cover 52, plugging any opening in the switch compartment and using an explosion-proof motor with an external conduit connection to the switch compartment. The wide flange 548 of the torque limit switch assembly 492, the wide flange 746 of the position limit switch assembly 520 and, if used, the deep bore 394 of the electric interlock switch block 388 constitutes inherent explosion-proof design of components which project through the wall of the switch compartment.

*Modified clutch operator*

In adapting the basic principles of the aforedescribed valve control to smaller size valves, several modifications directed to simplified components are feasible without disturbing the dependability and simplicity of operation of the over-all assembly.

A smaller size valve control assembly 800 is shown in FIGURES 16 and 17, which are respectively analogous to FIGURES 5 and 6 of the hereinbefore described valve control assembly 30. The smaller control assembly 800 includes a housing 802 with the recessed side wall 804, side cover 806, top cover 808, motor 810 and handwheel (not shown). The assembly 800 also includes a motor adaptor mount 812, the torque spring retainer 814, torque limit assembly 816 and position limit assembly 818. Excepting for the take-off drive of the position limit assembly 818, the aforenoted components and function of such components is substantially identical with the corresponding components of valve control assembly 30 and will not be further described.

The drive nut unit 820 consists of the drive sleeve 822 journalled between the housing base and top cover 808 as is true of the larger assembly 30. The drive sleeve 822 has an inner wear nut 824 having cooperating drive splines and a retainer nut 826, the hammer lug type of worm wheel 828 and worm wheel retaining and bearing space sleeve 830.

Note, sleeve 830 has been modified to include a position limit take-off drive gear 832 circumscribing the sleeve at an intermediate point and further, the sleeve 830 is rigidly maintained non-rotatable relative to the drive sleeve 822 by a set screw 834. Preferably the take-off drive gear 832 is a worm, although it could be a helical gear, and it is engaged by an appropriate input gear 836 (shown in dotted lines in FIGURE 16) on the end of the drive shaft 838 for the position limit assembly 818.

Referring primarily to FIGURE 16, several modifications in the worm shaft and clutching assembly arrangement are possible with acceptable and dependable results due to the smaller size of the control assembly and the smaller forces involved. Primarily the small size and small force involved permits use of a pull rod 840 directly connected to the clutch fork 842 in lieu of the helical cam operator with its higher mechanical advantage. A trigger lug pull knob 844 is secured by a pin 846 on the exterior end of pull rod 840. Clutch spring 848 in this embodiment is placed on the clutch shaft 850 and directly urges the shiftable clutch element 852 into its motor drive position. Here, as in the valve control assembly 30, the handwheel drive side of the clutch embodies dovetail shaped clutch teeth which hold the clutch in a handwheel drive position, so long as torque is applied through the handwheel gear element 854. The clutch is spring biased to the motor drive position which is accomplished through engagement of the straight clutch teeth.

In a smaller unit the components are lighter and the forces involved are not as high as in the larger heavier units, and thus one of the bearings and the spline sleeve between clutch shaft 850 and the worm 860 has been omitted, the clutch shaft being journalled at one end in a ball bearing 862 disposed in a socket in the motor adaptor plate 812 and, adjacent its other end, in a ball bearing 864 disposed in a recess 866 of a casting 868 integral with housing 802. The driving end 870 of the clutch shaft projects into a blind bore 872 of the worm 860 and is non-rotatably but axially slidably fastened to the worm by means of a key 874 and keyway 876.

The shank 878 of worm 860 is secured at its end to a thrust bearing 880 secured in a thrust bearing retainer 882 which is slidable in bore 884 of the control assembly housing 802. Bearing retainer 882 is connected to and biased to a neutral position by the thrust spring 886 in the same manner as has been hereinbefore described for the larger valve control assembly 30. The thrust bearing retainer peripheral edge 888 is engaged by the spring biased follower arm 890 of the torque limit assembly 816 which operates the same as does the previously described torque limit assembly 492.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dual drive, motor and manual, valve control assembly comprising: a plural number of condition responsive motor control components; a valve stem drive sleeve means, said drive sleeve means including a main drive sleeve, a removable wear insert mounted in non-rotatable relationship within said drive sleeve enabling drive connection between the main drive sleeve and a valve stem, and means accessible from the valve mounting end of the valve control assembly removably connected to said main drive sleeve and engaging said wear insert to maintain said wear insert and main drive sleeve in a fixed axial relationship; and transmission means to selectively drive said sleeve means by motor power or manual power, said transmission means including means to normally provide a motor drive connection to said sleeve means, manually shiftable means to shift from a motor drive connection to a manual drive connection to said sleeve means, and means automatically operative subsequent to shifting to manual drive connection to maintain said transmission in its manual drive condition only so long as manual drive torque is being applied.

2. A valve control assembly comprising: a valve stem drive sleeve unit including a main drive sleeve; motor and manual input drive mechanisms; a transmission including a rotatable output member and means to selectively drive couple either of said input mechanisms with said rotatable output member; said means for selective drive coupling including a drive coupling retention means operable, upon selective drive coupling actuation to manual drive, to maintain said transmission in manual drive so long as manual input drive torque is applied; means providing a drive path between said rotatable output member and said drive sleeve including a solid worm with integral worm shaft and an axially fixed rotatably mounted spline sleeve providing a sliding coupling between said rotatable output member and the shaft of said worm and supporting one end of said worm; a bi-directionally shiftable worm shaft torque responsive assembly fixed to and supporting the other end of said worm; a sleeve wear insert structurally connected to and disposed within said drive sleeve for bottom removal without dismantling or disturbing the journalled mounting of said drive sleeve unit and other drive components of the valve control assembly; a valve control housing, having at least two compartments, one of which encloses said transmission, said worm and said drive sleeve unit; a position limit control assembly and a torque limit control assembly disposed in the other of said compartments isolated from the valve drive mechanisms and readily accessible for assembly, adjustment and removal; means operatively connecting said position limit assembly with said spline sleeve for position conditions dependent upon worm rotation; and means operatively connecting said torque limit assembly with said torque responsive mechanism for bi-directional torque conditions related to worm axial shift.

3. A valve control assembly as defined in claim 2 wherein said worm is relatively short and said two rotatably supported ends of said integral worm and shaft are closely adjacent the ends of said short worm whereby the worm support bearing load results in an extremely short coupled journalling arrangement.

4. In the valve control assembly as defined in claim 2, said worm constituting an axially, shiftable member subject to a reaction force due to torque transmitted to said drive sleeve unit, and said bi-directionally shiftable torque responsive assembly comprising: a cage fixed to said housing with spaced apart annular limit abutments, an elongate member projecting through said annular abutments and connected for shifting movement with said shiftably mounted member, two spaced abutment members slidable on said elongate member both of which are disposed between said annular abutment members and each of which is adapted to engage an associated one of said annular abutment members, a heavy compression coil spring on said elongate member between and normally urging said slidable abutment members into engagement with their respective associated annular abutment members, and means rigid on said elongate member adapted to be engaged by and limiting the maximum spacing between said slidable abutment member to a distance which enables engagement of said slidable abutment members with respective associated annular abutment members under normal urging by said coil spring.

5. A valve control assembly as defined in claim 2, wherein each of said limit control assemblies includes a motion transmitting mechanism passing between said two compartments and adapted to engage and be positioned by associated portions of the drive path members from said transmission to said drive sleeve; and means in encompassing sealed relationship to said motion transmitting mechanism enabling a spigotted sealed connection and providing fluid tight motion transfer between said two compartments of said valve control housing unit.

6. A valve control assembly as defined in claim 2, wherein said torque responsive assembly and said torque limit control assembly comprise: a bi-directional resiliently biased torque limit retainer cartridge assembly shiftable responsive to shifting movement of said worm under increasing valve positioning torque application; and a bi-directional torque limit switch assembly for controlling said motor drive mechanism, having an operator member engaging and responsive to movement of said cartridge assembly, and adjustable cam type limit switch operating means.

7. A valve control assembly as defined in claim 2, wherein said torque limit control assembly has mechanism for adjustably presetting the limits of rotation of a said drive sleeve unit by actuation of limit devices controlling energization of the motor comprising, in combination: a member adapted to be rotated in one direction responsive to said drive sleeve unit reaching one of its limit positions and to be rotated in the other direction responsive to said drive sleeve unit reaching its other limit position, a second member rotatable relative to said first member, means connecting said first and second members for conjoint rotation including a worm and worm wheel connection enabling relative angular adjustment between said members and a motor control device engaged by and adapted to be operated by movement of said second member to a predetermined angular position.

8. A valve control assembly as defined in claim 2, wherein said position limit control assembly comprises: a double gear and cam set device providing a high drive reduction; a dual position limit switch resiliently biased to one of its positions; a limit switch actuator structurally cooperating with said double gear and cam set device and adapted to be shifted thereby to engage and actuate said limit switch to the other of its positions against the resilient bias of said switch; an adaptor means mounting said gear and cam set devices, said limit switch and said actuator in said other housing compartment and including means providing a sealed spigotted connection and fluid tight motion transfer between said two compartments of said valve control housing.

9. A valve control assembly as defined in claim 2, wherein an internal passage for electrical line connections is provided in said housing between said motor and said other compartment; a cover is provided for said other compartment including means enabling hinged opening of said cover relative to said other compartment; the cooperative cover and other compartment structure constitute a planar joinder between said cover and said other compartment providing inherent construction to enable the complete valve control to be made explosion proof.

10. A valve control assembly adapted to move a valve stem comprising, in combination with a valve control housing: a manually driven shaft rotatably mounted in said housing having a manual drive gear thereon; a motor operated shaft rotatably mounted on said housing having a motor drive gear thereon; a clutch shaft rotatably mounted in said housing; a reciprocable double-ended clutch member slidably but non-rotatably mounted on said clutch shaft; a manually driven gear rotatably mounted in said housing in coaxial relation to said clutch shaft, said manually driven gear being in engagement with said manual drive gear; manual drive clutching means connected to said manually driven gear for clutching engagement with said clutch member when said clutch member is slidably shiftable to a manual drive position; a motor driven gear rotatably mounted in said housing in coaxial relation to said clutch shaft, said motor driven gear being in engagement with said motor drive gear; motor drive clutching means connected to said motor drive gear for clutching engagement with said clutch member when said clutch member is in motor drive position; movable yoke means connected to said clutch to shift it; means exerting a resilient biasing force on said clutch member and urging it to a motor drive position; means manually operable to exert pressure on and to move said yoke means to shift said clutch member from motor drive position to manual drive position against the resilient biasing force and to hold the clutch member in said latter position only during the period of operation of said yoke moving means; and means responsive to continuous application of turning torque on said manually driven shaft subsequent to shifting of said clutch member to manual drive position by manual operation of the yoke moving means to maintain said clutch member in manual drive position.

11. A valve control assembly as defined in claim 10, wherein said means for maintaining the clutch member in its manual drive position comprise mating dove-tail undercut axially directed clutch jaws in facing relation on said manual drive clutching means and on one end portion of said clutch member.

12. A valve control assembly as defined in claim 11, wherein said other end of said clutching member and said motor drive clutching means comprise axially straight mating clutch jaws.

13. In a clutch mechanism, a manual input driving means, a power input driving means, a shiftable clutch member, a shaft upon which said shiftable clutch member is non-rotatably but axially shiftably mounted for shift through a neutral position between two operative positions respectively for engagement with said manual and said power input driving means, wherein but one of said driving input means can be engaged by said clutch member at one time to turn said shaft, means resiliently biasing said shiftable clutch member toward engagement with said power driving means, and bi-directional dove-tail, locking clutching teeth for preventing relative axial movement of and maintaining clutching engagement, against the resilient bias, between said shiftable member and said manual driving input means during continual manual driving subsequent to a shift of said shiftable member to manual drive position.

14. Valve control assembly comprising in combination: a handcrank; a manually driven gear; first connecting means drive connecting said manually driven gear to said handcrank; a motor; a motor driven gear; second connecting means drive connecting said motor driven gear to said motor; a rotatable clutch shaft; a reciprocable double-ended clutch member slidably and non-rotatably mounted on said clutch shaft; one end of said clutch member being adapted to connect said manually driven gear to said first connecting means when said clutch member is in manual drive position; the other end of said clutch member being adapted to connect said motor driven gear to said second connecting means when said clutch member is in motor drive position; manually operable means for shifting said clutch member from motor drive position to manual drive position and for holding the clutch member in said latter position only during the period of manual operation of the shifting means; and means associated with said one end of said clutch member and with said manually driven gear and responsive to continual application of manual drive torque through said handcrank to maintain said clutch member in manual drive position subsequent to its being shifted to manual drive position by the manual operation of said shifting means.

15. In the valve control assembly as defined in claim 14, said clutch shifting means including cooperating rotary cam and cam follower operating mechanism operatively connected to said slidable clutch member.

16. In the valve control assembly as defined in claim 14, said clutch shifting means including a manual pull rod and means rigidly connected to said rod and rotatably engaging said slidable clutch member, and a clutch biasing spring encircling said clutch shaft to urge said clutch member toward said motor drive position.

17. A valve control assembly comprising in combination: a handcrank; a manually driven gear; means drive connecting said manually driven gear to said handcrank; a motor; a motor driven gear; means drive connecting said motor driven gear to said motor; a rotatable clutch shaft; a reciprocable double-ended clutch member slidably and non-rotatably mounted on said clutch shaft; said manually driven gear adapted to be connected to said clutch member when said clutch member is in manual driven position; said motor driven gear adapted to be connected to said clutch member when said clutch member is in motor drive position; means to shift said clutch member from motor drive position to manual drive position; said clutch shift means including an axially fixed rockable shaft parallel to said clutch shaft; a cam rigidly secured on said rockable shaft; a cam follower axially shiftably carried on said rockable shaft and rotatably connected to said shiftable clutch member to prevent relative rotation with said rockable shaft; biasing means urging said cam follower toward engagement with said cam; and means responsive to continual application of manual drive torque through said handcrank to maintain said clutch member in manual drive position subsequent to its being shifted to manual drive position.

References Cited by the Examiner

UNITED STATES PATENTS

| | | | |
|---|---|---|---|
| 1,163,085 | 12/15 | Hardy | 192—108 |
| 1,907,171 | 5/33 | Anderson. | |
| 2,049,127 | 7/36 | Maybach | 192—67 |
| 2,327,980 | 8/43 | Bryant. | |
| 2,598,062 | 5/52 | Krecan | 251—134 |
| 2,631,709 | 3/53 | Anderson | 192—141 |
| 2,723,830 | 11/55 | Markley | 251—134 |
| 2,745,294 | 5/56 | Kron | 74—625 |
| 2,854,113 | 9/58 | Hallden | 192—141 |
| 2,893,259 | 7/59 | Cullender | 74—424.8 |
| 2,916,947 | 12/59 | Morrell | 74—625 |
| 2,989,878 | 6/61 | Denkowski et al. | 74—625 |
| 3,026,744 | 3/62 | Rouse | 74—625 |
| 3,069,924 | 12/62 | Watanabe et al. | 74—424.8 |

FOREIGN PATENTS 842,581  7/60  Great Britain.

DON A. WAITE, *Primary Examiner.*